United States Patent [19]
Greub

[11] Patent Number: 5,086,500
[45] Date of Patent: Feb. 4, 1992

[54] SYNCHRONIZED SYSTEM BY ADJUSTING INDEPENDENTLY CLOCK SIGNALS ARRIVING AT A PLURALITY OF INTEGRATED CIRCUITS

[75] Inventor: Hans-Jurg Greub, Troy, N.Y.

[73] Assignee: Tektronix, Inc., Beaverton, Oreg.

[21] Appl. No.: 449,445

[22] Filed: Dec. 12, 1989

Related U.S. Application Data

[63] Continuation of Ser. No. 84,003, Aug. 7, 1987, abandoned.

[51] Int. Cl.⁵ ............................................. G06F 13/00
[52] U.S. Cl. .......................... 395/550; 364/232.23; 364/232.8; 364/271; 364/271.5; 364/931.55; 364/950.3; 364/950.4; 364/DIG. 1; 340/825.2
[58] Field of Search ... 364/200 MS File, 900 MS File; 340/825.14, 825.2

[56] References Cited

U.S. PATENT DOCUMENTS

| | | | |
|---|---|---|---|
| 3,192,398 | 6/1965 | Benedict | 307/606 |
| 3,502,991 | 3/1970 | Sampson | 328/130 |
| 4,270,167 | 5/1981 | Koehler et al. | 364/200 |
| 4,386,401 | 5/1983 | O'Brien | 364/200 |
| 4,396,980 | 8/1983 | Hingarh | 364/200 |
| 4,494,021 | 1/1985 | Bell et al. | 307/591 |
| 4,705,606 | 11/1987 | Young et al. | 204/15 |
| 4,754,154 | 6/1988 | Flora et al. | 307/269 |
| 4,760,290 | 7/1988 | Martinez | 307/465 |
| 4,805,196 | 2/1989 | Cooperman et al. | 375/107 |

*Primary Examiner*—Thomas C. Lee
*Assistant Examiner*—Ayni Mohamed
*Attorney, Agent, or Firm*—John P. Dellett; John Smith-Hill

[57] ABSTRACT

A reduced instruction set computer processor, having a rapid access, dual port register file for supplying operands to a high speed arithmetic logic unit, is implemented as a set of integrated circuits interconnected by constant impedance transmission lines and synchronized by a common clock signal. The transmission lines interconnecting the integrated circuits are formed by thin metallic foil conductors separated by dielectric polyimide membranes. The clock signal is adjustably delayed prior to transmission to each integrated circuit so that pulses of the clock signal arrive at each integrated circuit at the same time regardless of differences in inherent delays of the separate paths the clock signal must follow to each integrated circuit.

13 Claims, 14 Drawing Sheets

CLASS 1 INSTRUCTIONS

CLASS 2 INSTRUCTIONS

ARITHMETIC AND CONTROL INSTRUCTIONS

STORE INSTRUCTIONS

LOAD INSTRUCTIONS

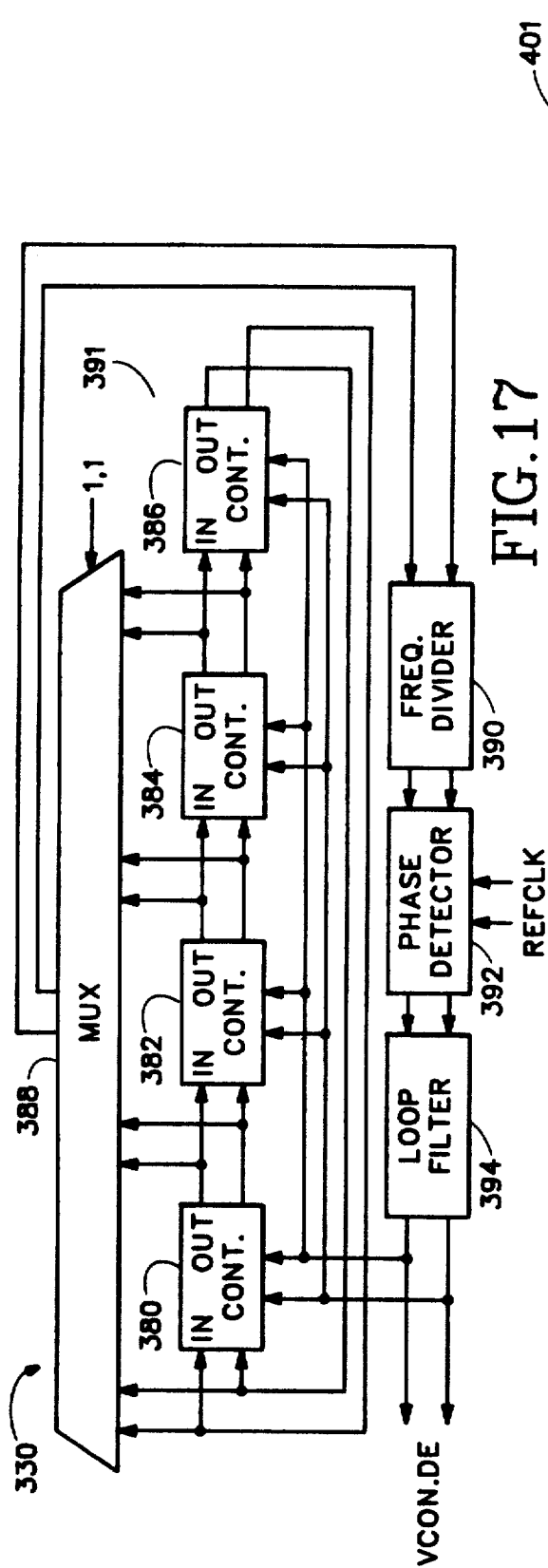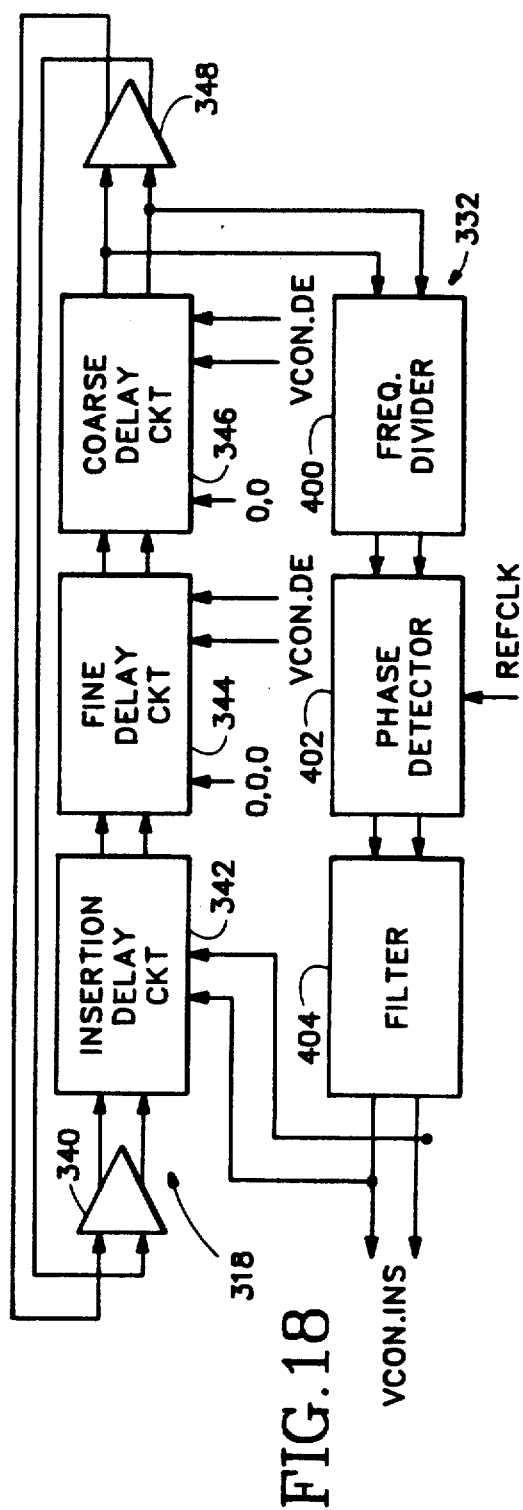
FIG. 17
FIG. 18

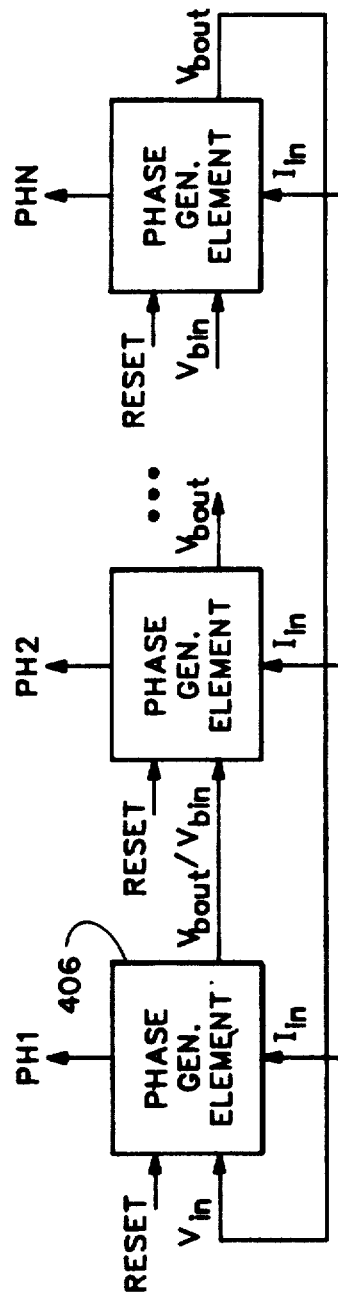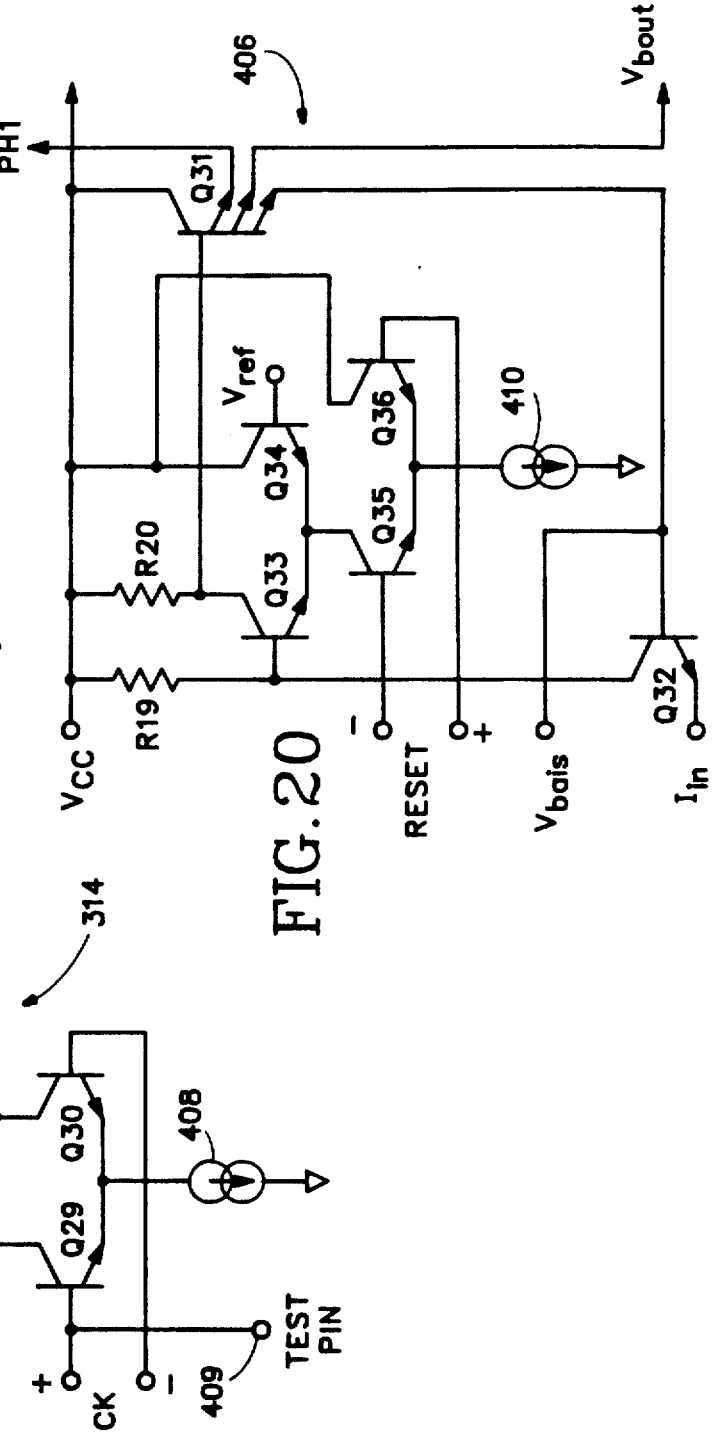
FIG. 19
FIG. 20

SYNCHRONIZED SYSTEM BY ADJUSTING INDEPENDENTLY CLOCK SIGNALS ARRIVING AT A PLURALITY OF INTEGRATED CIRCUITS

This is a continuation of application of Ser. No. 07/084,003 filed Aug. 7, 1987 and now abandoned.

BACKGROUND OF THE INVENTION

The present invention relates to computer processors in general and in particular to a high speed reduced instruction set computer implemented by a plurality of interconnected integrated circuits.

Advanced bipolar and gallium arsenide (GaAs) technologies permit the manufacture of high speed logic gates having propagation delays less than a nanosecond, and a computer processor utilizing such technologies would be exceptionally fast. However, it has generally not been feasible to implement very large scale integrated (VLSI) circuits using currently available advanced bipolar or GaAs technology because large numbers of bipolar logic gates dissipate too much power to be concentrated in a single integrated circuit, and because GaAs circuit fabrication processes have prohibitively low yields. Consequently, circuits implemented by such technologies have been limited to large or medium scale integration, rather than very large scale integration.

One way to increase the yield of an integrated circuit fabrication process, or to decrease the amount of power that an integrated circuit dissipates, is to decrease the complexity of the circuit being implemented in integrated circuit form. Simplified "reduced instruction set computer" ("RISC") processors have been proposed and constructed which reduce the amount of circuitry needed by reducing the number and complexity of instructions that the processors implement. Although RISC processors typically require more instructions to carry out certain operations than would more complex processors, it is believed that the decrease in processor performance due to the decrease in instruction set complexity can be more than offset by the increase in processing speed that can be obtained by utilizing higher speed integrated circuit technologies. However, reduced instruction set computers still require relatively large integrated circuits, and problems associated with low yield and high power dissipation have not been entirely solved by reducing the size and complexity of instruction sets.

Computer processors have been implemented utilizing hybrid circuits comprising several smaller scale integrated circuits mounted on a substrate and interconnected by microstrip conductors to overcome problems associated with low yields or high power dissipation of very large scale integrated circuits. However, partitioning of a high speed computer processor operating at high frequencies into a set of interconnected integrated circuits has not been feasible because signals transmitted between such integrated circuits would be of frequencies at which signal delay and reflections in microstrip conductors interconnecting the signals become problematic. In addition, operations of the various portions of a high speed computer processor are typically synchronized to a master clock signal, and variation in inherent delays of conductors conveying the master clock signal to each integrated circuit limits the frequencies at which the separate integrated circuits can exchange data with one another in a synchronous fashion, and therefore limit processing speed.

SUMMARY OF THE INVENTION

In accordance with one aspect of the invention, a reduced instruction set computer processor is implemented as a plurality of integrated circuits interconnected by low loss, constant impedance transmission lines conveying signals between bonding pads of the integrated circuits. The transmission lines comprise thin metallic conductors separated by dielectric polyimide membranes, the conductors being electrically connected to the bonding pads of the integrated circuits by bond wires and conductive vias extending through the membrane. Partitioning the computer into a plurality of integrated circuits reduces fabrication costs when low yield semiconductor fabrication technology is employed and allows heat generated by the processor to dissipate rapidly. The use of constant impedance, low loss transmission lines minimizes reflection and delay of data signals transmitted between integrated circuits. In addition, the manner in which the transmission lines are implemented permits the separate integrated circuits to be closely spaced so as to minimize lengths of signal paths therebetween, thereby minimizing signal transmission delays.

In accordance with another aspect of the invention, operations of the separate integrated circuits are synchronized one to another by a master clock signal, and a clock signal skew compensation circuit is provided for delaying transmission of pulses of the master clock signal by a separately adjustable delay time for each integrated circuit requiring a clock signal. The master clock signal delays are adjusted so that each pulse of the master clock signal arrives at each integrated circuit at the same time regardless of variation in time delay of the clock signal path between the skew compensation circuit and the various integrated circuits.

It is accordingly an object of the invention to provide a high speed computer.

It is another object of the invention to provide a system for interconnecting and synchronizing high speed integrated circuits.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DRAWINGS

FIG. 17 is a schematic diagram of the delay element monitor of FIG. 11;

FIG. 18 is a schematic diagram of the insertion delay monitor of FIG. 11;

FIG. 19 is a combination block and schematic diagram of a phase generator of FIG. 11;

FIG. 20 is a schematic diagram of a phase generator element of FIG. 19;

DETAILED DESCRIPTION

Figure 1:
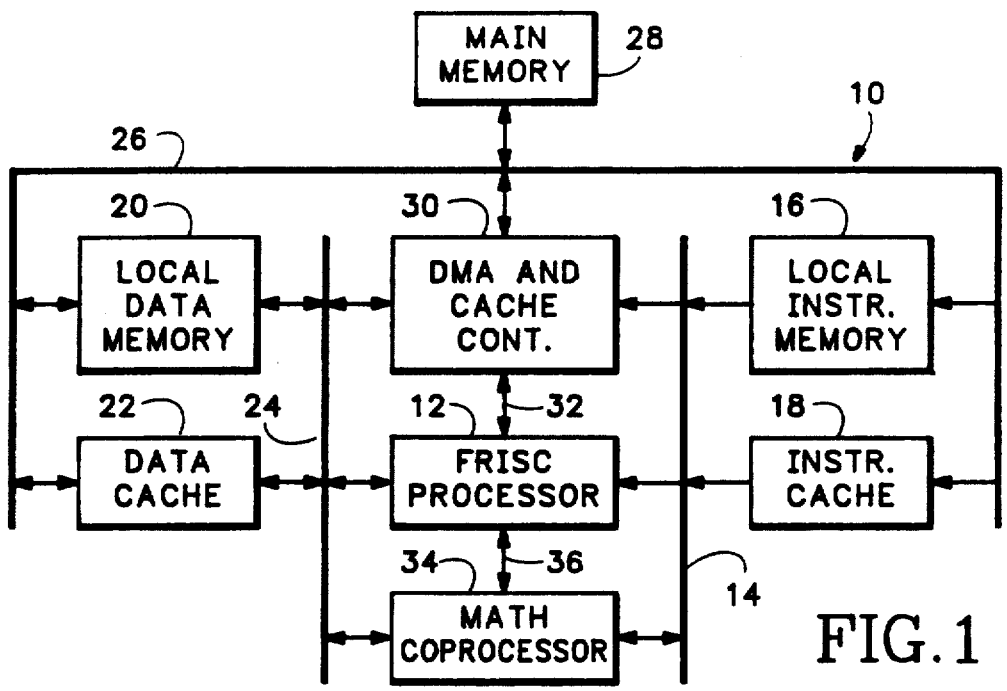
FIG. 1 is a block diagram of a reduced instruction set computer system in accordance with the present invention.

With reference to FIG. 1 there is depicted in block diagram form a computer system 10 in accordance with the present invention. System 10 includes a fast, reduced instruction set computer (FRISC) processor 12 that operates in accordance with instructions conveyed on an instruction bus 14 from a local instruction memory 16 and from an instruction cache memory 18. Processor 12 transmits and receives data to or from a local data memory 20 and a data cache memory 22 via a data bus 24. Local instruction memory 16, instruction cache memory 18, local data memory 20, and data cache memory 22 are all two-port memories, the second port of each memory 16–22 being accessed through a system bus 26 providing read/write access to a main memory 28. Data and instructions are transferred between main memory 28 and memories 16–22 via system bus 26 under control of a direct memory access (DMA) and cache controller 30.

The address space of processor 12 is organized into pages. Memories 16–22 are small, high speed memories with access times on the order of 4 ns providing FRISC processor 12 with quick access to a few pages of memory. Main memory 28 stores many pages of instructions and data that may be utilized by processor 12, but is slower than memories 16–22. The data and instruction caches are normally used for temporarily holding recently accessed pages of data and instructions. During system operation, a page of instructions stored in main memory 28 to be accessed by processor 12 is first transferred into instruction cache 18, and then supplied from the instruction cache to the FRISC processor 12 via bus 14. When processor 12 subsequently seeks to access another page of instructions not contained in instruction cache 18, the other page is first transferred into the instruction cache from main memory 28, writing over a previously stored page. The local instruction memory 16 is normally used for long term storage of instructions such as interrupt subroutines that are utilized frequently, and these instructions may be loaded into the local instruction memory from the main memory 28 at system startup. When processor 12 seeks to read or write data to an address within a particular page within its address space, the page is initially transferred from main memory 28 to data cache 22. The local data memory 20 may be utilized for longer term storage of pages of frequently accessed data.

Controller 30 monitors addresses placed on busses 14 and 24 and interrupts processor 12 when an address is not in a page currently in one of memories 16-22, the interrupt signal being conveyed on one of lines 32 interconnecting the controller 30 and processor 12. Processor 12 then suspends the memory access until controller 30 has transferred the appropriate page from main memory 28 into the appropriate memory 16–22 and has asserted another interrupt to indicate that the data page is now in the appropriate memory. Processor 12 then resumes the memory access. A math coprocessor 34 also having access to instruction bus 14 and data bus 24 are provided for fast arithmetic operations under control of signals from processor 12 via interconnecting lines 36.

Figure 2:
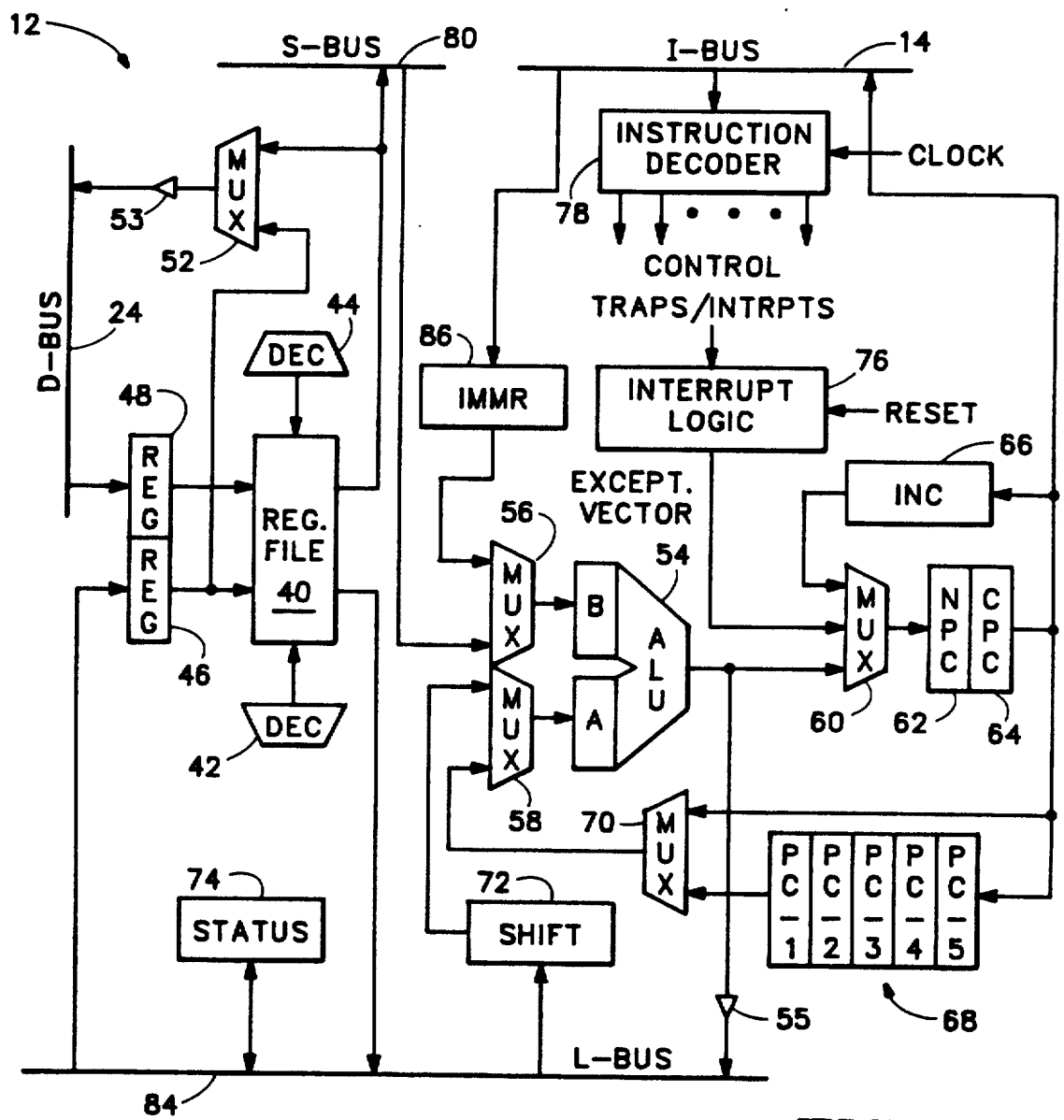
FIG. 2 is a block diagram of the reduced instruction set computer processor of FIG. 1.

The FRISC processor 12 is shown in more detailed block diagram form in FIG. 2. Incoming 32-bit data on data bus ("D-bus") 24 is stored in a register 48, and data stored in register 48 may be subsequently stored in one of 30 registers within a register file 40. Register file 40 has two data input/out ports which may be read or write accessed simultaneously. A port "B" permits data to be written into a particular register in register file 40 from register 48 and permits data to be read out of a particular register in register file 40 to an "S" bus 80. The particular register accessed through port B is selected by a signal produced by an address decoder 44. A port "A" permits data to be written into register file 40 from another register 46 and read out to an "L" bus 84. The particular register of register file 40 being accessed through port A is selected by a signal produced by another address decoder 42.

Data on S-bus 80 may be applied to a "B" input of an arithmetic logic unit (ALU) 54 via a multiplexer 56, and data on L bus 84 may be applied to an A input of ALU 54 via a shift register 72 and another multiplexer 58. The data in register file 40 or in register 46 may be alternatively supplied through a multiplexer 52 and a buffer 53 to D-bus 24. The data on L-bus 84 provides input to register 46. The instruction bus ("I-bus") 14 conveys instructions to an instruction decoder 78 for decoding the instructions and supplying control signals to various components of processor 12, operations of the instruction decoder being synchronized to a system CLOCK signal. Instruction decoder 78 also addresses both ports of register file 40 via address decoders 42 and 44. Certain instructions transmitted on the instruction bus 14 include data operands as well as instructions to be decoded, and the data operands are supplied as input to an "immediate" register (IMMR) 86. The data stored in register 86 may be supplied to the B input of ALU 54 via multiplexer 56.

ALU 54 may perform one of four selectable functions on its A and B inputs: ADD, AND, OR, and XOR (exclusive OR). The B input can also be inverted prior to performing one of these operations. In addition, the shift register 72 can pass the data unchanged, shift its input data left or right by one bit, or shift left by 4 bits. Thus, the shift register provides the capability to multiply by 2 or 16, or divide by 2. Operations of shift register 72, ALU 54 and all buffers and multiplexers of FIG. 2 are controlled by signals from instruction decoder 78.

The output data of ALU 54 may be placed back onto L-bus 84 through a buffer 55 and fed back to its input via shift register 72, may be stored in register file 40 via register 46, or may be transferred out on D-bus 24 via register 46, multiplexer 52 and buffer 53. The output data of ALU 54 may also be applied as input to a "next program counter" register (NPC) 62 via a multiplexer 60. The output of register 62 is applied as input to a current program counter (CPC) register 64, and the output of register 64 is incremented by an incrementer 66 and supplied to an additional input of multiplexer 60. An interrupt logic circuit 76 receives interrupt, trap and reset signals from ALU 54 and external sources including controller 30 and coprocessor 34 of FIG. 1 and supplies in response thereto an "exception vector" input to multiplexer 60.

The CPC register 64 holds the current program count, the address of an instruction to be fetched, the address being sent out on address lines of the instruction bus 14 to the local instruction memory 16, the instruction cache 18 and the DMA and cache controller 30 of FIG. 1. Incrementer 66 increments the current program count by 1, and as the processor executes the currently fetched instruction, multiplexer 60 may be switched to supply the incremented program count output of incrementer 66 as input to the NPC register 62. NPC register 62 is input enabled on the next system cycle to store the next program count. To initiate the next instruction fetch, the program count in NPC register 62 is shifted into CPC register 64. The current program count may also be supplied though multiplexer 70 and multiplexer 58 to the A input of ALU 54. This permits jump, branch and return operations whereby a number supplied to the B input of the ALU is added to the current program count and then stored in NPC register 62 to provide the next program count. The current program count is also shifted into a stack of five registers (PC-1 through PC-5) 68 that saves the addresses of the last executed instructions. The processor uses instruction pipelining as discussed hereinbelow, and it is necessary to recall the last 5 instructions in order to return to normal operation after an interrupt or trap has occurred and been serviced.

The processor can operate in either a normal mode of operation or in an "exception" (or "interrupt") mode that occurs whenever the processor is interrupted. The register file 40 is divided into two banks, each bank being assigned to a separate mode so that when an interrupt occurs, the data accumulated in register file 40 during its normal mode of operation need not be disturbed by a interrupt handling routine requiring access to register files. When the interrupt logic 76 detects a trap, interrupt or reset, it loads an exception vector into NPC register 62 via multiplexer 60 and the exception vector indicates the starting address of an the interrupt handling routine. The following traps and interrupts are implemented: nonmaskable interrupt, maskable interrupt, arithmetic trap, cache miss data, cache miss instruction, system error and reset.

The L-bus 84 provides read/write access to two 16-bit status registers 74, one which contains various flags indicating the status of the processor during its normal mode of operation, and the other indicating the status of the processor during the exception mode. The two status registers share 5 flags; two user-definable input flags, two user-definable output flags, and one flag write enabling the output flags. The other 11 flags are duplicated in each status register and include a mode flag from interrupt logic 76 indicating whether the processor is in normal or exception mode, 5 carry flags from shift register 72, negative, zero, overflow and carry flags from ALU 54, and an interrupt enable flag.

Figure 3:
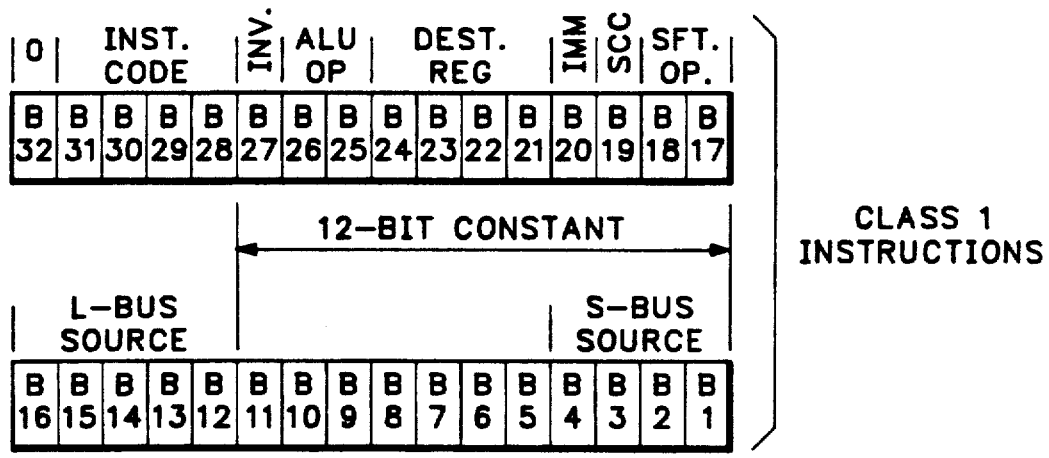
FIG. 3 is a diagram of bit patterns of instructions of the reduced instruction set computer
Figure 3:
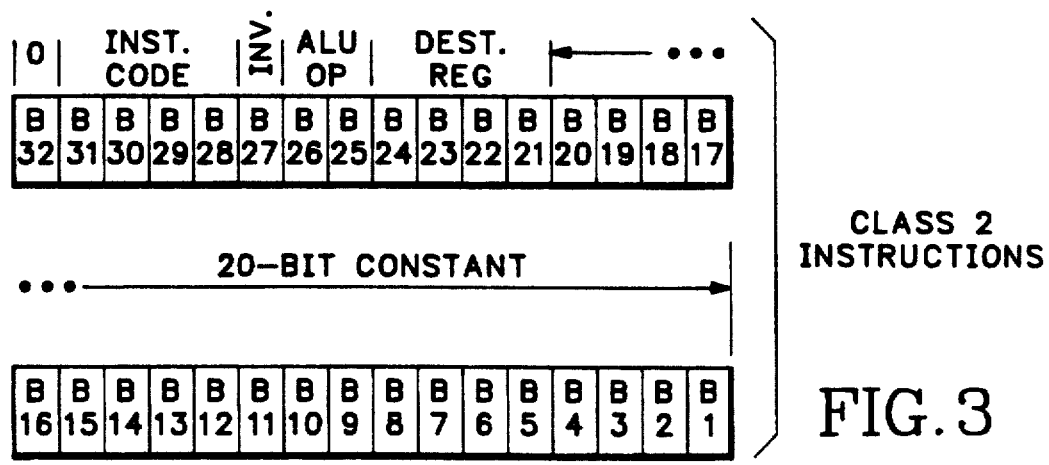

FIG. 3 illustrates two classes of instructions that may appear on the instruction bus 14. A class 1 instruction is identified by a 0 as bit B32. A class 2 instruction is identified by, a 1 as bit B32. In a class 1 instruction, bits B28-B31 include an instruction code identifying the nature of the instruction, bit B27 indicates whether the B operand of the ALU 54 is to be inverted, bits B21-B24 indicate the particular register in register file 40 to receive the result of the operation, and bit B20 indicates whether the data stored in the immediate mode register 86 is to be supplied to the B input of ALU 54 instead of the data on S-bus 80. Bit B19 indicates whether to set the condition code flags in the status register 74 of FIG. 2. Bits B17 and B18 indicate how shift register 72 is to shift the A input to ALU 54. Bits B13-B16 indicate the particular register in register file 40 to supply the data to L-bus 84 and bits B1-B12 comprise the immediate constant to be stored in IMMR register 86 when the instruction is an immediate mode instruction. When the instruction is not immediate mode, bits B1-B4 indicate the register of register file 40 to supply data to S-bus 80 and bits B5-B12 are unused. In a class 2 instruction, bits B21-B32 have the same functions as bits B21-B32 of the arithmetic instruction and bits B1-B20 may contain a constant to be stored in immediate register 86.

Table I shows the available instruction set where "ALUOP" is any one of the following ALU operations: ADD, XOR, OR or AND with operand A selectively unshifted or shifted one bit to the left or right or four bits to the left, and operand B and/or the carry bit selectively inverted. "C" means "carry", and "AT" means enable the arithmetic trap, i.e., generate a trap if the ALU or shifter overflows. "SHEX" means "shift extended", i.e., shift carry bits into or out of the status register 74 from the shift register 72. "CC" references the condition codes in the status register and "PC" means program counter. Three different addressing modes are available for each I/O instruction; register, register ± 12-bit offset, and register indexed.

Table I

Arithmetic Instructions:
 ALUOP: (ADD, XOR, AND, OR)
 ALUOP C: (ALUOP with carry)
 ALUOP C AT: (ALUOP with carry and arithmetic trap)
 ALUOP SHEX: (ALUOP with extended shift)
 ALUOP SHEX C: (ALUOP with extended shift and carry)

ALUOP SHEX C AT: (ALUOP with extended shift, carry and arithmetic trap)

I/O Instructions:
  LOAD: (load data from external memory into register file)
  LOAD #±: (load 20-bit constant into register file)
  STORE: (store data from register file into external memory)
  PUSH (load data from external memory onto a register file stack)
  POP: (store data from the register file stack into external memory)

Control Instructions:
  JMP: (jump to new instruction address)
  JMPI: (jump and return to normal mode)
  BRANCH CC: (branch on condition code)
  SETSTATUS: (set the status register)
  GETSTATUS: (read the status register)
  MODIFYSTATUS: (change the status register)
  GETPC: (get program count)
  GETPC-5: (get contents of PC-5)
  NOOP: (no operation; do nothing)
  CLRI: (clear interrupt mode)
  RETURN: (return from subroutine)
  RETURNI: (return from interrupt)

Figure 4A:
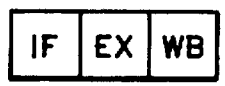
FIG. 4A is a diagram illustrating operating cycles required by the reduced instruction set computer processor of FIG. 2 to carry out instructions.
Figure 4A:
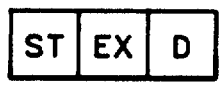
Figure 4A:
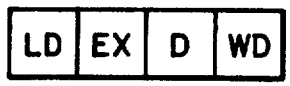

FIG. 4A illustrates the processor cycles required to fetch and execute arithmetic, control, load and store instructions. Arithmetic and control instructions require three system cycles: an instruction fetch cycle (IF) in which the instruction is obtained from the local instruction memory or the instruction cache, an execution cycle (EX) in which the instruction is carried out by the ALU, and a write cycle (WB) in which the ALU output data is stored in the register file. A store type I/0 instruction also requires three cycles: an ST cycle during which the store instruction is fetched, an execution cycle EX during which the address of the external memory location to receive data is calculated, and a data transmission cycle D during which the data is sent to the calculated address. The load type I/O instruction requires four cycles: an LD cycle in which the load instruction is fetched, an EX cycle in which the address of the data is calculated, a D cycle in which the data is obtained from external memory at the calculated address and then stored in register 48 of FIG. 2, and a WD cycle in which the data is transferred from register 48 into the register file 40.

Figure 4B:
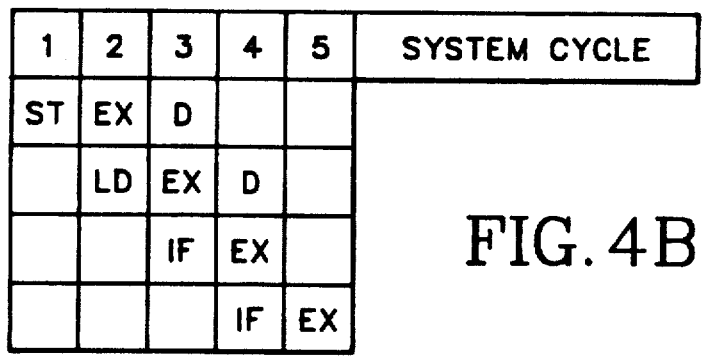
FIG. 4B is a diagram illustrating instruction pipelining carried out by the reduced instruction set computer processor of FIG. 2.

Although each instruction requires three or four clock cycles, the processor may utilize instruction pipelining to obtain a system throughput of one instruction per cycle. Pipelining is illustrated in FIG. 4B. A store instruction is fetched during system cycle 1 and executed during cycles 2 and 3. During cycle 2, while the ALU is calculating the address for the store instruction, a load instruction is fetched. During cycle 3, while the data referenced by the store instruction is transferred to external memory, the ALU calculates the address for the load instruction, and the instruction decoder fetches an arithmetic instruction. During cycle 4, data at the address calculated in accordance with the load instruction is stored in register 48 of FIG. 2, the arithmetic instruction is executed and a second arithmetic instruction is fetched. The second arithmetic instruction is executed during cycle 5. The WB and WD cycles for the load and arithmetic instructions are not shown in the instruction pipeline diagram of FIG. 4B because these cycles are not visible to the user.

Figure 5:
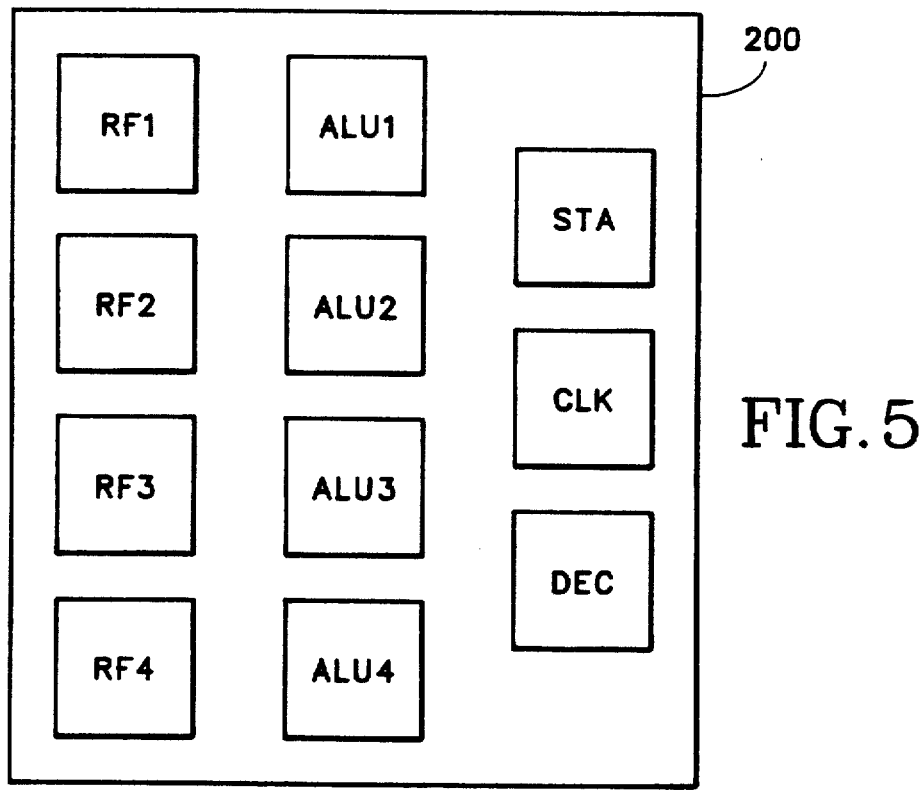
FIG. 5 is a plan view of a typical arrangement of integrated circuits implementing the reduced instruction set computer processor of FIG. 2 to carry out instructions.

The processor 12 of FIG. 2 is suitably implemented utilizing bipolar current tree logic which is very fast but utilizes large amounts of power. In accordance with the present invention, in order to provide for sufficient heat dissipation, the processor 12 is implemented as a set of separate integrated circuits interconnected by constant impedance transmission lines. With reference to FIG. 5, four identical integrated circuits (ALU1ALU4) implement shift register 72, buffer 55, incrementer 66, multiplexers 56, 58, 60 and 70, ALU 54, and registers 62, 64, 68 and 86 of FIG. 2. Four other identical integrated circuits (RF1-RF4) implement the register file 40 of FIG. 2. One integrated circuit (STA) implements the status registers 74 of FIG. 2 and another integrated circuit (DEC) implements the instruction decoder 78 and interrupt logic circuit 76 of FIG. 2. An additional integrated circuit (CLK) is a clock and skew control circuit that generates and transmits master CLOCK signals to each of the other integrated circuits. The 11 integrated circuits are interconnected by a transmission module 200 as described hereinbelow.

Figure 6:
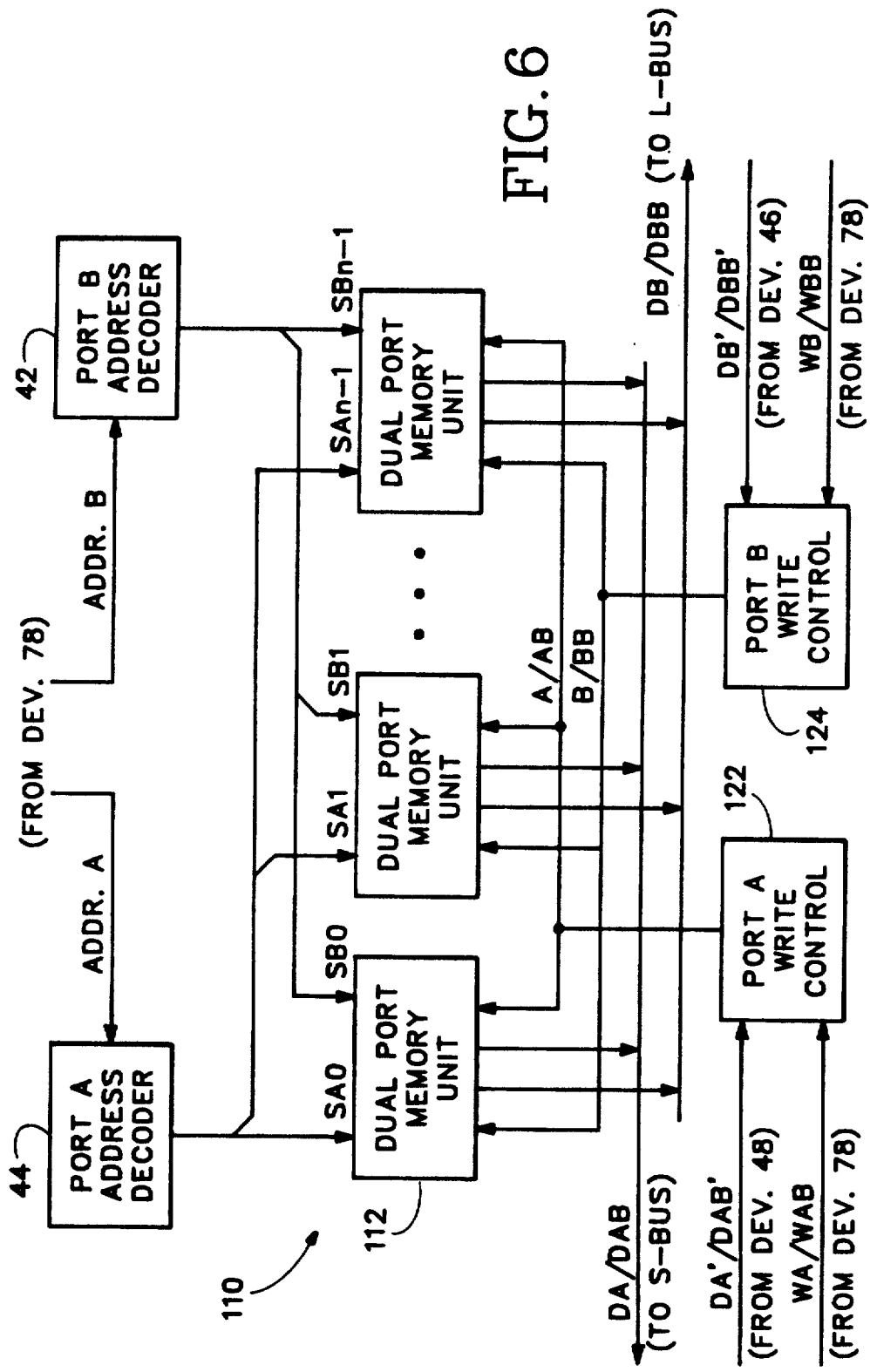
FIG. 6 is a block diagram of a dual-port memory implementing a portion of the register file of FIG. 2.

The dual port register file 40 is implemented as a set of 32 single-bit dual port memories, each dual port memory having 30 storage addresses. With reference to FIG. 6, each dual-port memory 110 is adapted to provide concurrent read and/or write access via separate data, address and control busses. Memory 110 stores n=30 bits, each bit being stored at a separate address. Thus for each address there is provided 30 separate dual port memory units 112, shown in more detailed block diagram form in FIG. 7, comprising a pair of memory cells ("cell A" 114 and "cell B" 116). Each cell of the pair is independently accessible by separate differential data input signals (A/AB and B/BB), separate binary read/write enable signals (SA* and SB*, where "*" represents the cell address 0 through n-1), from instruction decoder 78 of FIG. 2, and a common differential "cross-coupling" signal Y/YB.

An SA* or an SB* read/write enable signal is asserted when the cell to which it is applied is to be read or write accessed. A selected one of the SA* read/write enable signals is asserted by port A address decoder 44 which decodes an address transmitted on a port A address bus ADDR.A from instruction decoder 78 of FIG. 2. Only one SA* read/write enable signal is asserted at any given time. Similarly, one of the SB* read/write enable signals is asserted by port B address decoder 42 which decodes an address transmitted on a port B address bus ADDR.B by instruction decoder 78 of FIG. 2.

The A/AB data input signal, applied in common to each cell A of each memory unit 112, is produced by a port A write control circuit 122 which monitors the state of a data bit conveyed on a port A input data bus DA'/DAB' from register 48 of FIG. 2, and also monitors a differential write control signal WA/WAB produced by instruction decoder 78 of FIG. 2. When a particular cell A is being accessed, a data bit of appropriate state is placed on port A input data bus DA'/DAB', and the address of the cell is placed on address bus ADDR.A. The instruction decoder then asserts write control signal WA/WAB. The write control circuit 122 then sets the state of the A/AB data input signal to a first or a second (positive or negative voltage) state in accordance with the state of the bit on the port A input data bus DA'/DAB'. The particular cell A enabled by the read/write enable signal SA* produced by port A address decoder 42 then sets the state of its stored bit to match the state of the A/AB data input signal. Thereafter, the instruction decoder 78 deasserts the write control signal WA/WAB thereby causing the port A write control circuit 122 to set the data input signal A/AB to a third state.

Figure 7:
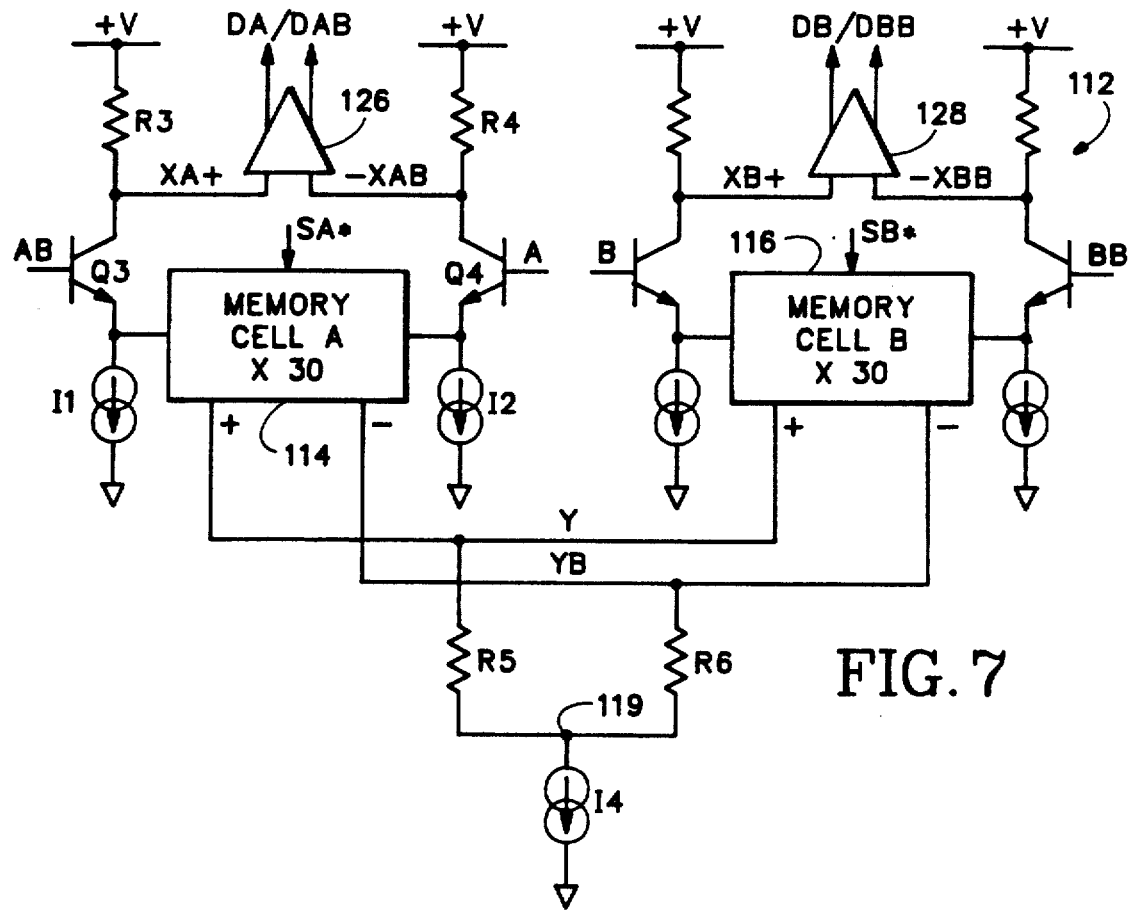
FIG. 7 is a more detailed block diagram of a portion of the dual port memory of FIG. 6.

With reference to FIGS. 6 and 7, cell A of each memory unit 112 produces a data output signal XA/XAB applied to the input of an amplifier 126, the output of which is connected to a port A output data bus DA/-DAB connected to S-bus 80 of FIG. 2.

To read access a particular cell A, instruction decoder 78 of FIG. 2 utilizes decoder 44 to place the address of the cell on port A address bus ADDR.A causing port A address decoder 42 to assert the appropriate read/write enable signal SA*. However, the write control signal WA/WAB input to port A write control circuit 122 is not asserted. Control circuit 122 sets the A/AB input data signal to its third state, and in response, the particular cell A enabled by an asserted SA* read/write enable signal sets the state of its XA/XAB data output signal positive or negative to match the state of its stored data bit. Buffer 126 then drives the state of the bit on the port A output data bus DA/DAB positive or negative in response to the XA/XAB data output signal. Thus in order to read access a cell A of a particular memory unit 112, the instruction decoder places the address of the cell on the ADDR.A bus without asserting the WA/WAB write control signal. When a cell A is not read enabled, it sets its XA/XAB data output signal to a third state so that amplifier 126 does not actively drive the port A output data bus either positive or negative.

A port B write control circuit 124, similar to write control circuit 122, monitors a WB/WBB write control signal from the instruction decoder, and monitors the state of a bit on a DB'/DBB' data bus from register 48 of FIG. 2, and produces in response thereto a three-state B/BB data input signal applied to the cell B of each memory unit 112. Cell B of each memory unit 112 produces a data output signal XB/XBB applied to the input of another differential amplifier 128, the output of which is connected to a port B output data bus DB/DBB connected to L-bus 84 of FIG. 2. The B/BB data input signal is similar in purpose to the A/AB data input signal produced by write control circuit 122 and causes the particular cell B enabled by an SB* read/-write enable signal to read or write a data bit in a similar manner.

As shown in FIG. 7, cell A and cell B of each memory unit 112 are each accessed by a differential cross-coupling signal Y/YB developed across a pair of series-connected resistors R5 and R6. A current source I4 supplies current to a junction node 119 between resistors R5 and R6. When the bits stored in cells A and B are of matching positive or negative states, cross-coupling signal Y/YB is of a similar positive or negative state. When the state of the bit stored in either one of the cells A or B is changed during a data write access, that cell changes the state of the cross-coupling signal Y/YB, and the change in state of the cross-coupling signal forces a change in state of the bit stored in the other cell immediately following the write operation. Thus during a write operation the cell being write accessed controls the state of the cross-coupling signal Y/YB in accordance with the state of its data input signal, and the cell that is not being write accessed responds to the cross-coupling signal by appropriately setting the state of its stored data bit following the write operation.

Figure 8:
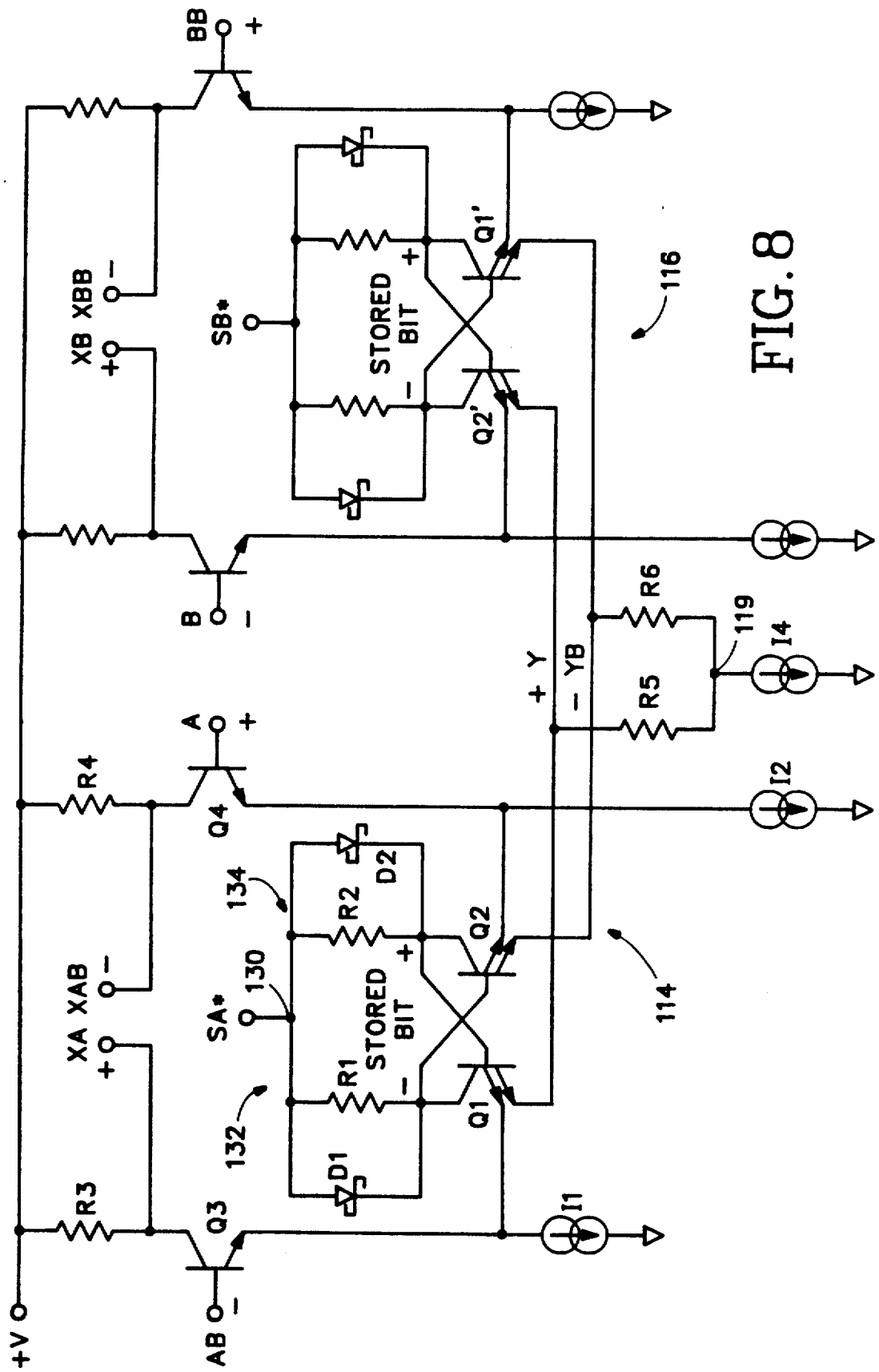
FIG. 8 is a schematic diagram of a portion of the dual port memory of FIG. 7.

A single memory unit 112, excluding amplifiers 126 and 128, is shown in FIG. 8 in schematic diagram form. With reference to FIG. 8, memory cell A (device 114) includes first and second two-emitter transistors Q1 and Q2, the collector of transistor Q1 being connected to the base of transistor Q2 and the collector of transistor Q2 being connected to the base of transistor Q1. The collector of transistor Q1 is also coupled to a circuit node 130 through a voltage clamp 132 consisting of a parallel combination of a Schottky diode D1 and a resistor R1. Similarly, the collector of transistor Q2 is also coupled to circuit node 130 through another voltage clamp 134 consisting of a parallel combination of another Schottky diode D2 and another resistor R2. The read/write enable signal SA* is applied to node 130. The data input signal A/AB is applied across the bases of third and fourth transistors Q3 and Q4 having collectors coupled to a voltage source +V through resistors R3 and R4, respectively. The emitter of transistor Q3 is connected to a first emitter of transistor Q1 and also to a first current source I1. Similarly, the emitter of transistor Q4 is connected to the first emitter of transistor Q2 and to a second current source I2. The cross-coupling signal Y/YB is applied across second emitters of transistors Q1 and Q2 such that when Y/YB is positive, the second emitter of Q1 is higher in potential than the second emitter of Q2. Memory cell B (device 116) is similar to memory cell A except that the cross-coupling signal is applied across the second emitters of transistors Q1' and Q2' (corresponding to transistors Q1 and Q2 of cell A) with opposite polarity such that when Y/YB is positive, the emitter of Q2' is higher in potential than the emitter of Q1'.

Referring to FIGS. 7 and 8, the state of the bit stored by cell A is determined by whether transistor Q1 or transistor Q2 is on. The stored bit is in its first state (positive) when transistor Q1 is on and transistor Q2 is off, and is in its second state (negative) when transistor Q2 is on and transistor Q1 is off. When transistor Q1 is on, it supplies current via resistor R5 to current source I4, and its collector potential is pulled below the voltage of read/write enable signal SA*. Since the collector of transistor Q1 is low, the base of transistor Q2 is low and transistor Q2 tends to stay off. Since transistor Q2 is off, resistor R2 pulls the voltage of its collector and the base of transistor Q1 up, thereby tending to keep transistor Q1 on. Similarly, when transistor Q2 is on, it supplies current via resistor R6 to current source I4 and its collector is pulled below the voltage of read/write enable signal SA* by the amount of the drop across diode D2. Since the collector of transistor Q2 is low, the base of transistor Q1 is low and transistor Q1 is off. Since transistor Q1 is off, resistor R1 pulls the base of transistor Q2 up, thereby tending to keep transistor Q2 on.

The state of the bit stored in cell A (i.e., the polarity of the potential between collectors of transistors Q2 and Q1) may be altered during a write operation. For example, to switch the stored bit from negative to positive (second state to first state) the data input signal A/AB is set positive such that the potential at the base of transistor Q4 is higher than the potential at the base of transistor Q3. Therefore, the emitter of transistor Q3 will be at a lower potential than the emitter of transistor Q4. The read/write enable signal SA* is then asserted, thereby pulling up the bases of both transistors Q1 and Q2. Since the first emitter of transistor Q1 is at a lower potential than the first emitter of transistor Q2, and is sufficiently lower than its base potential to permit transistor Q1 to turn on, transistor Q1 begins to conduct some of the current of current source I4. The increased collector current through transistor Q1 pulls down the potential of the base of transistor Q2 and transistor Q2 begins to conduct less current. The collector potential of transistor Q2 therefore rises and helps to turn on transistor Q1. This positive feedback between the collectors and bases of transistors Q1 and Q2 quickly causes transistor Q1 to turn on and transistor Q2 to turn off, thereby changing the state of the stored bit from negative to positive.

To switch the stored bit from positive to negative (first state to second state), the data input signal A/AB is set negative (its second state) wherein the potential at the base of transistor Q3 is higher than the potential at the base of transistor Q4. Thus the first emitter of transistor Q2 is driven to a lower potential than the first emitter of transistor Q1.

When the read/write enable signal SA* is asserted, transistor Q2 begins to conduct more current than transistor Q1 and increased collector current through transistor Q2 pulls down the base of transistor Q1 which begins to turn off. Positive feedback between transistors Q1 and Q2 quickly turns transistor Q1 on and turns transistor Q2 off, thereby switching the state of the stored bit.

During other than a write operation, the data input signal A/AB is set to its third state (zero volts) wherein the bases of transistors Q3 and Q4 are held at the same potential. In such case, the collector-emitter impedances of transistors Q3 and Q4 are substantially equal and the state of the differential data output signal XA/XAB depends on the relative amount of current in the collectors of transistors Q3 and Q4. The magnitudes of resistors R3 and R4 and the magnitudes of current sources I1 and I2 are chosen so that when the read/write enable signal SA* is low, i.e., when cell A is not read/write enabled, the first emitters of transistor Q1 and transistor Q2 are at higher potentials than their bases and no current flows in their first emitters. Transistors Q3 and Q4 conduct the same amount of current, and the voltage drops across resistor R3 and resistor R4 are equal. Thus the output data signal XA/XAB is at 0 potential, its "third" logic state.

However, when, during a read operation the read/write enable signal SA* is driven high while, for example, transistor Q1 is on and transistor Q2 is off, the base of transistor Q1 rises above the potential of its first emitter by an amount sufficient to produce a current in its first emitter. This current reduces the amount of collector current that is supplied through transistor Q3 and causes the potential at the collector of transistor Q3 to rise above the potential of the collector of transistor Q4. Thus, the output data signal XA/XAB is driven to its positive first state.

On the other hand, when during a read operation the read/write enable signal SA* is driven high, while transistor Q2 is on and transistor Q1 is off, the base of transistor Q2 rises above the potential of its first emitter by an amount sufficient to produce a current in its first emitter. This current reduces the amount of current that is supplied through transistor Q4, thereby causing the potential at the collector of transistor Q4 to rise above the potential of the collector of transistor Q3. Thus, the output data signal XA/XAB is driven to its negative second state.

It should be noted that cell A also changes the state of the cross-coupling signal Y/YB when it changes the state of its stored bit during a write operation. For example if the stored bit is in its positive, first state, transistor Q1 is on, transistor Q2 is off, the cross-coupling signal Y/YB is positive. When during a write operation cell A subsequently turns on transistor Q2 and turns off transistor Q1, the cross-coupling signal switches to its negative state. Cell B is similar to cell A, and it too can change the state of the cross-coupling signal Y/YB when the state of its stored bit changes during a write operation.

When cell A changes the state of the cross-coupling signal as it is being write accessed, cell B does not immediately respond to the change in cross-coupling signal state because the current of current source I4 is supplied entirely through cell A and therefore transistors Q1' and Q2' are off. When cell A is no longer write enabled, SA* is driven low, causing current source I4 to pull down the potential at node 119. The second emitter of one of transistors Q1' and Q2' is thus pulled lower than the other depending on the state of the cross-coupling signal Y/YB, causing one of transistors Q1' and Q2' to turn on, thereby setting the state of its stored bit to match the state of the cross-coupling signal. In a similar manner, cell A also sets the state of its stored bit to match the state of the cross-coupling signal after cell B has been write accessed.

Figure 9:
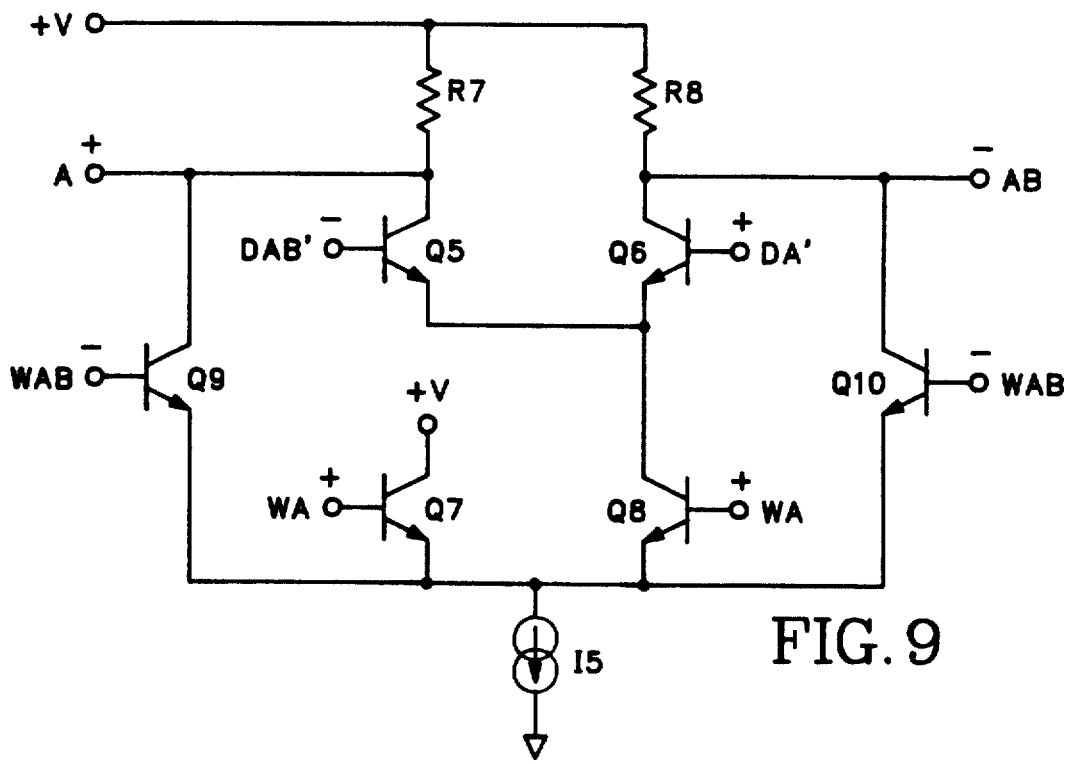
FIG. 9 is a schematic diagram of the write control circuit of FIG. 6.

FIG. 9 shows the port A write control circuit 122 of FIG. 6 in schematic diagram form. The port B write control circuit is similar. Write control circuit 122 comprises a set of transistors Q5-Q10, resistors R7 and R8, and a current source I5. The emitters of transistors Q7-Q10 are coupled to a current source I5, and the emitters of transistors Q5 and Q6 are connected to the collector of transistor Q8. The collectors of transistors Q5 and Q9 are coupled to a positive voltage source +V through resistor R7 and the collectors of transistors Q6 and Q10 are coupled to +V through resistor R8. The collector of transistor Q7 is directly connected to voltage source +V. The write enable signal WA/WAB is applied across the bases of transistors Q7 and Q9 and also across the bases of transistors Q8 and Q10. Data bus DA'/DAB' is connected to the bases of transistors Q6 and Q5 and the data input signal A/AB supplied to the memory units is developed across the collectors of Q5 and Q6.

When the WA/WAB write control signal is not asserted, the bases of transistors Q9 and Q10 are driven high and the bases of transistor Q7 and Q8 are driven low so that transistor Q9 and transistor Q10 turn on and transistors Q7 and Q8 turn off. Equal amounts of the current supplied by current source I5 passes through transistors Q9 and Q10 and between resistors R7 and R8 so that the potential across resistor R7 is equal to the potential across resistor R8. Thus the potentials of the collectors of transistors Q5 and Q6 are equal and the data signal A/AB is driven to its third state, 0 voltage. When the WA/WAB write control signal is asserted, transistors Q7 and Q8 turn on and transistors Q9 and Q10 turn off. Current from current source I5 passes through transistor Q8 and through either transistor Q5 or transistor Q6 depending on which transistor Q5 or Q6 is on. If the signal on data bus DA'/DAB' is positive, the current passes through transistor Q6 and resistor R8 pulling the potential of the collector of transistor Q6 down, thereby driving the data signal A/AB positive. If the signal on data bus DA'/DAB' is negative, the current passes through transistor Q5 pulling down the potential of its collector and driving the data signal A/AB negative.

Figure 10A:
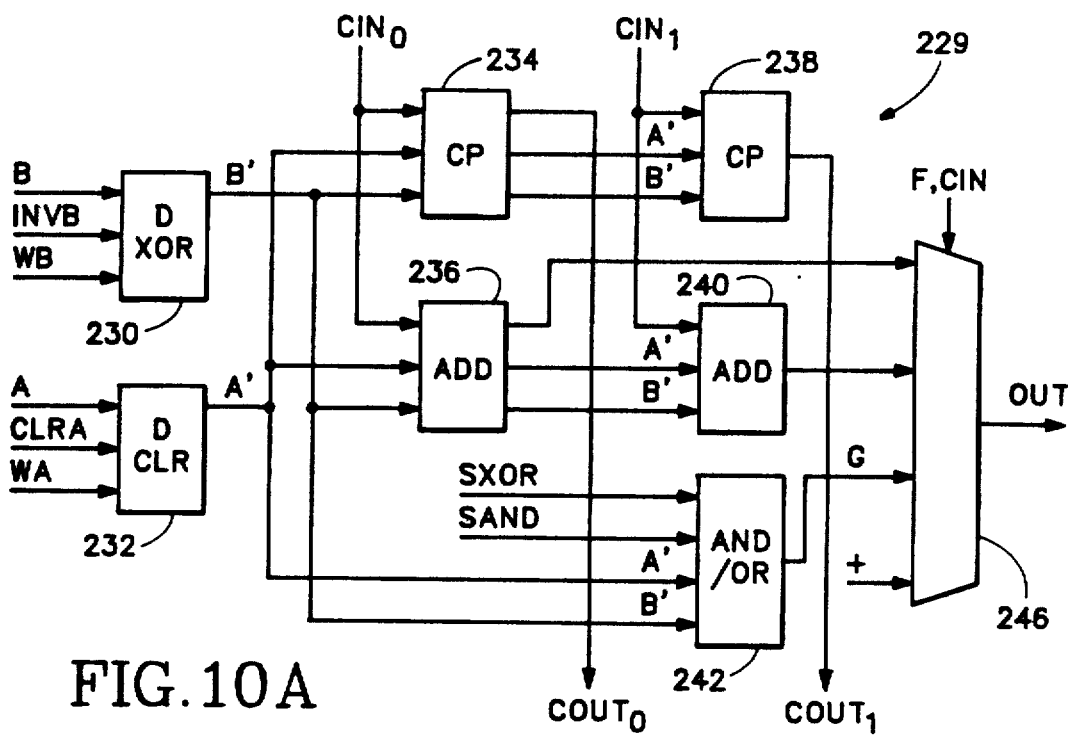
FIG. 10A is a block diagram of the ALU1 circuit of FIG. 5.

ALU 54 of FIG. 2 is implemented as a set of 32 one-bit ALUs, one of which is shown in FIG. 10A in block diagram form. With reference to FIG. 10A, a one-bit ALU 229 includes a D-type "XNOR input" latch 230 having as input one bit of the 32-bit B input data to ALU 54 of FIG. 2, and an INVB bit driven high by instruction decoder 78 of FIG. 2 when the instruction that it decodes indicates that the B input is to be inverted. Latch 230, input enabled by a WB bit from the instruction decoder, produces an output bit B' = B XOR INVB. Thus B' is equal to B if INVB is a 0 and is the inverse of B if INVB is a 1. A single bit of the 32-bit A input data to ALU 54 is applied to the input of a type D latch 232, and latch 232 produces an output bit A' matching the state of its input bit A after being enabled by a WA signal from the instruction decoder. A CLRA signal from the instruction decoder is applied to a reset input of latch 232 and allows the instruction decoder to reset A' to 0.

The A' and B' outputs of latches 230 and 232 are applied as inputs to a set of logic circuits 234, 236, 238, 240 and 242. An adder circuit 236 sums bits A' and B' and a first carry in bit $CIN_0$ from another one-bit ALU that responds to the next lower order bits of the A and B data inputs to ALU 54 of FIG. 2. Another adder circuit 240 adds A', B' and a second carry in bit $CIN_1$ from the lower order one-bit ALU. (For the lowest order one-bit ALU, the carry in bits are both tied to a logical 0 level source.) An AND/OR logic circuit 242 also having as inputs control bits SXOR and SAND from the instruction decoder produces an output G in accordance with the following expression:

G = [SXOR AND (A' XOR B')] OR [SAND AND (A' AND B')]

The outputs of adders 236 and 240 and of logic circuit 242 are supplied as inputs to a 4×1 multiplexer 246 having a switching state controlled by F and C-N signals produced by the instruction decoder. The fourth input to multiplexer 246 is tied to a positive voltage source. Multiplexer 246 supplies a selected one of its input bits as the output bit of the one-bit ALU.

A first carry bit propagation circuit (CP) 234 has the A', B' and $CIN_0$ bits as inputs and produces a first carry out bit $COUT_0$ in accordance with the following expression:

$COUT_0$ = [A AND B]

OR [A AND (NOT B) AND $CIN_0$]

OR [(NOT A) AND B AND $CIN_0$]

A second carry bit propagation circuit (CP) 238 has the A', B' and $CIN_1$ bits as inputs and produces a L second carry out bit $COUT_1$ in accordance with the following expression:

$COUT_1$ = [A AND B]

OR [A AND (NOT B) AND $CIN_1$]

OR [(NOT A) AND B AND $CIN_1$]

The first and second carry out bits produced by each one-bit ALU are provided as the first and second carry in bits to the next higher-order ALU. The carry out bits of the highest order ALU are provided as overflow signals to the instruction decoder.

Figure 10B:
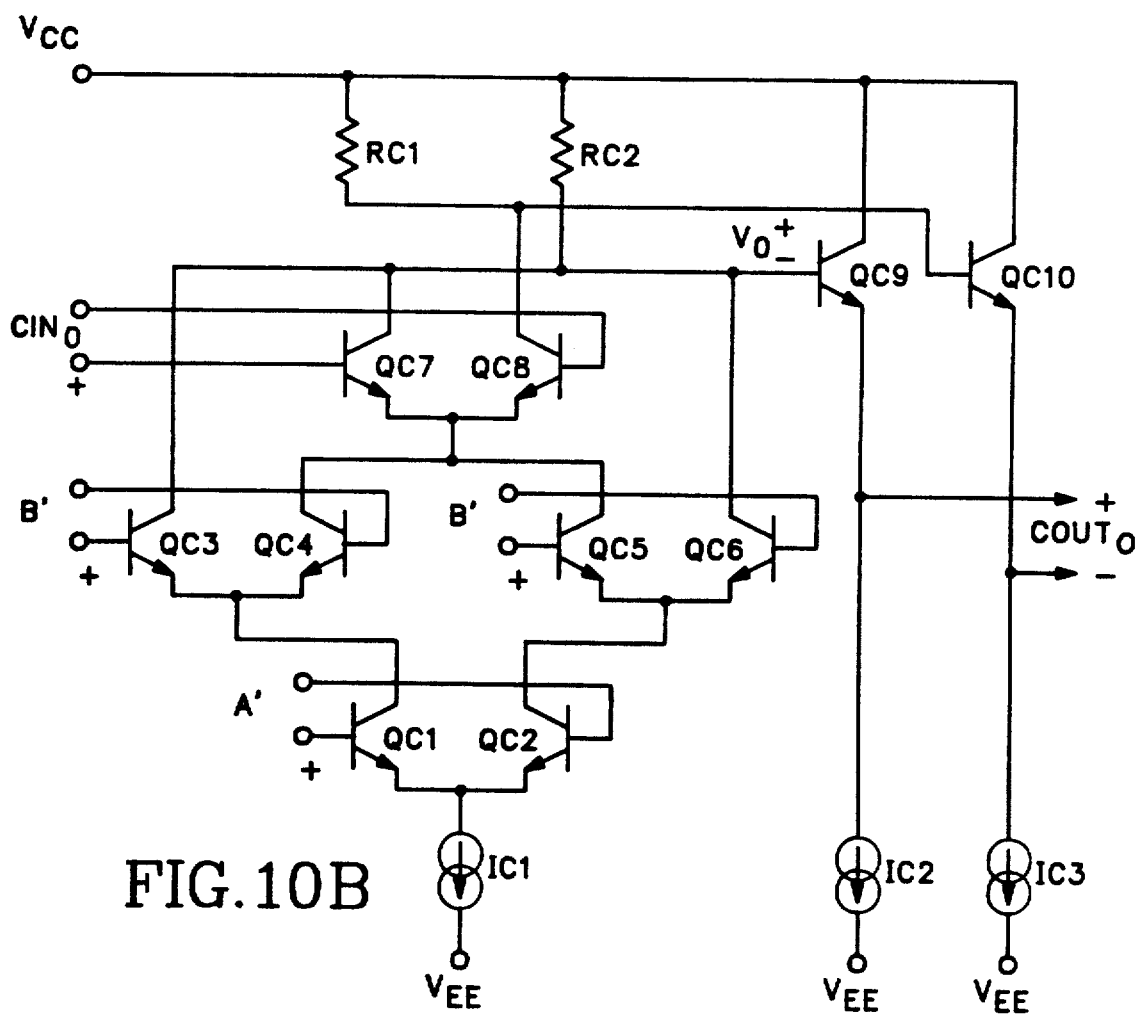
FIG. 10B is a schematic diagram of a carry propagation circuit of FIG. 10A.

The devices shown in FIG. 10A are implemented by differential current tree logic circuits utilizing bipolar junction transistors. The first carry propagation circuit 232 of FIG. 10A, shown in schematic diagram form in FIG. 10B is an example of differential current tree logic. A pair of transistors QC1 and QC2 have emitters coupled to negative voltage source VEE through a current source IC2. The collector of QC1 is connected to the emitters of another pair of transistors QC3 and QC4 and the collector of QC2 is connected to the emitters of yet another pair of transistors QC5 and QC6. The collectors of QC4 and QC5 are tied to the emitters of transistors QC7 and QC8. The collector of QC8 is coupled to a positive voltage source VCC through a resistor RC1 and the collector of QC7 is coupled to VCC through another resistor RC2. The base of an output buffer transistor QC9 is connected to the collectors of transistors QC3, QC7 and QC6, and the base of another output buffer transistor QC10 is connected to the collector of QC8. VCC is supplied to the collectors of QC9 and QC10. The emitter of QC9 is coupled to VEE through a current source IC2 and the emitter of QC10 is coupled to VEE through another current source IC3.

The A', B', $CIN_0$ and $COUT_0$ signals are all differential signals, A' being applied across the bases of QC1 and QC2, B' being applied across the bases of QC3 and QC4 and also across the bases of QC5 and QC6, and $CIN_0$ being applied across the bases of QC7 and QC8. $COUT_0$ is produced across the emitters of QC9 and QC10. When, for example, A' and B' are both positive (logic state 1), QC1 and QC3 are on and switch the current of source IC1 through resistor RC2, driving positive a voltage Vo across the bases of QC9 and QC10, thereby driving $COUT_0$ positive. As another example, when A' is negative, B' is positive, and $CIN_0$ is negative, transistors QC2, QC5 and QC8 are on, thereby directing current through RC1, pulling the base of QC10 low, thereby driving $COUT_0$ negative.

Differential current tree logic utilizing bipolar transistors provides fast signal propagation. In addition, the current supplied to the circuit remains constant regardless of its switching state, thereby avoiding generation of destructive switching transients that are prevalent in many other types of logic circuits. However, current tree logic utilizing bipolar transistors produces substantial amounts of heat, and in accordance with the present invention, the FRISC processor 12 of FIG. 1 is partitioned into several integrated circuits, as illustrated in FIG. 5 and interconnected as described hereinbelow so as to increase the surface area available to dissipate the heat. The processor utilizes clocked latches to trap the outputs of the various integrated circuits so as to synchronize data transmission therebetween, clock signals being produced on the CLK integrated circuit of FIG. 5 and transmitted to the other integrated circuits. However, inasmuch as the separate integrated circuits are of varying distances from the CLK integrated circuit, the clock signal transmitted to each of the other integrated circuits is delayed by varying amounts in accordance with the variation in length of the various paths it must traverse. Variation in inherent delay of input and output buffers can also cause differences in clock signal delay. If pulses of the clock signal were to arrive at each integrated circuit at different times, loss of synchronisim could occur.

Figure 11:
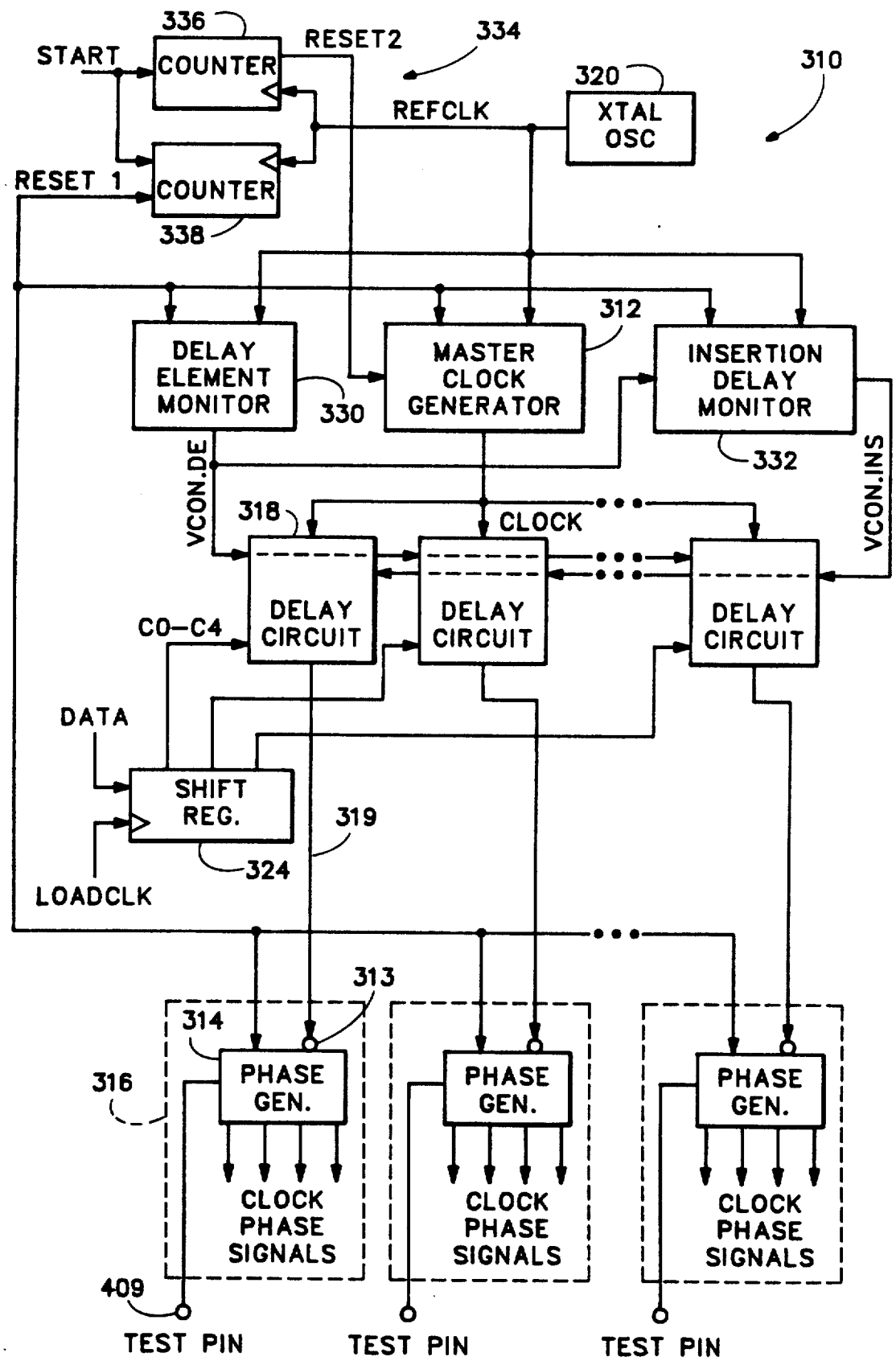
FIG. 11 is a block diagram of a skew compensation circuit of the CLK integrated circuit of FIG. 5.

To overcome this problem the CLK integrated circuit of FIG. 5 includes a skew compensation circuit which transmits a clock signal to each of the other integrated circuits of FIG. 5, each pulse of the clock signal being adjustably delayed prior to transmission to an integrated circuit so that the pulse arrives at each integrated circuit at the same time. With reference to FIG. 11, the skew compensation circuit 310 is adapted to transmit a clock signal (CLOCK) generated by a master clock generator 312 to nodes 313 within each of a plurality of separate integrated circuits 316. The CLOCK signal is transmitted to each node 313 via separate adjustable delay circuits 318 and transmission lines 319, and each delay circuit 318 is adjusted to delay the CLOCK signal so that each pulse of the CLOCK signal arrives at each node 313 substantially at the same time. A phase generator 314, implemented in each integrated circuit 316 requiring multiple phase clocks, monitors the clock signal arriving at node 313 and produces one or more clock phase signals used to control the timing of the integrated circuit 316 in which it is implemented. Clock phase signals are produced sequentially at regular intervals after receipt of the first pulse of the CLOCK signal following deassertion of a RESET1 signal applied as input to the phase generator, and following receipt of every CLOCK signal pulse thereafter. Since the operation of each integrated circuit 316 is synchronized to the same master CLOCK signal, and since each CLOCK signal pulse arrives at each integrated circuit at the same time, the separate integrated circuits 316 may operate together in a synchronous fashion and exchange data with each other without need for asynchronous communication channels.

The master clock generator 312 is suitably a resettable phase locked loop circuit producing N output CLOCK signal pulse in response to every pulse of an input reference clock signal (REFCLK). The REFCLK signal may be produced, for example, by a crystal-controlled oscillator 320 of the type having a highly stable frequency. The master clock generator 312 also has an input for a RESET2 signal which, when asserted, drives the CLOCK output of the clock generator high, and prevents the generator from producing clock signal pulses. A startup control circuit 334 asserts the RESET2 signal to reset the master clock generator 312 on receipt of an externally generated START signal. At the same time, the startup control circuit 334 asserts the RESET1 signal that resets each phase generator. The startup control circuit 334 then deasserts the RESET1 signal to enable phase generator operation and thereafter deasserts the RESET2 signal to enable master clock generator operation.

The startup control 334 circuit suitably comprises two counters 336 and 338 for counting pulses of the REFCLK signal, each count being reset by the START signal. Counter 336 asserts the RESET2 signal and counter 338 asserts the RESET1 signal upon receipt of the START signal. Counter 336 deasserts the RESET2 signal after it has counted a predetermined number of REFCLK signal pulses, and counter 338 deasserts the RESET1 signal after it has counted a higher predetermined number of REFCLK signal pulses.

The amount of CLOCK signal delay provided by each delay circuit 318 is determined by five-bit control data C0-C4 separately supplied to each delay circuit through a shift register 324 which shifts in each bit of an externally generated serial DATA input in response to each pulse of an externally generated LOADCLK signal pulse. The delay of each delay circuit 318, as set by data C0-C4 is stabilized by a pair of analog control signals, VCON.DE and VCON.INS respectively, produced by a delay element monitor 330 and an insertion delay monitor 332 as described in detail hereinbelow.

Figure 12:
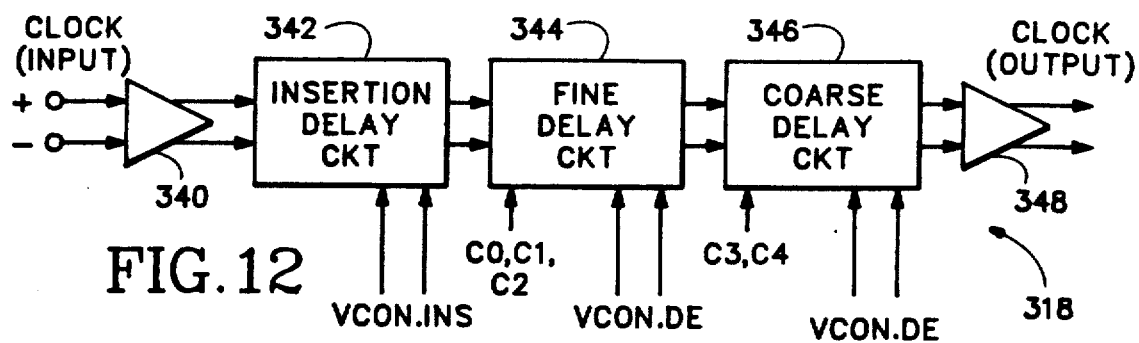
FIG. 12 is a block diagram of a delay circuit of FIG. 11.

FIG. 12 shows a block diagram of a typical delay circuit 318 of FIG. 11 including an input buffer 340 for buffering the input CLOCK signal, a sequence of adjustable delay circuits (insertion delay circuit 342, fine delay circuit 344 and coarse delay circuit 346) for successively delaying the output of buffer 340 by adjustable delay times, and an output buffer 348 for buffering the output of coarse delay circuit 346 so as to produce the delayed CLOCK signal output of delay circuit 318. The delay of coarse delay circuit 346 may be adjusted to $mT + I_1$ seconds, where m is an integer from 0–3, T is a fixed unit delay time and $I_1$ is a constant "insertion" delay, the minimum delay of circuit 346. The selection of m is determined by the values of bits C3 and C4 of the control input data C0-C4 shown in FIG. 11.

The fine delay circuit 344 may be adjusted for a delay of $(n/8)T + I_2$ seconds where n is an integer from 0 to 7 determined by the value of control data bits C0-C2, T is the fixed unit delay time, and $I_2$ is the constant insertion delay of circuit 344. The delay ($D_{ins}$) of the insertion delay circuit 342 may be continuously adjusted over its full range in accordance with the magnitude of the VCON.INS control signal output of insertion delay monitor 332 of FIG. 11. The unit delay T of the fine and coarse delay circuits 344, 346 is controlled in accordance with the magnitude of the VCON.DE signal produced by the delay element monitor 330 of FIG. 11.

Given that buffers 340 and 348 have delays of $D_1$ and $D_2$ respectively, the total delay $T_{tot}$ of delay circuit 318 is the sum of the delays provided by its constituent devices 340–348:

$$T_{tot} = D_1 + D_{ins} + (mT + I_1) + (nT/8 + I_2) + D_2. \quad [1]$$

Rearranging terms of equation [1]:

$$T_{tot} = [m + (n/8)]T + T_{ins} \quad [2]$$

where $$T_{ins} = (D_1 + D_2 + I_1 + I_2 + D_{ins}) \quad [3]$$

The first term of equation [2] shows that the delay of circuit 318 may be adjusted to one of 32 levels in steps of T/8 seconds depending on the various combinations of values of m and n as determined by control data C0-C4. The second term of equation [2], $T_{ins}$, is the total insertion delay of delay circuit 318, the minimum delay that it provides when m=n=0.

In order to ensure that the delay $T_{tot}$ of delay circuit 318 remains constant once the values of m and n are selected, it is necessary that both the unit delay T and the insertion delay $T_{ins}$ remain constant. As mentioned hereinabove, the value of T is controlled by the VCON.DE output signal of delay element monitor 330 of FIG. 11 and the value of the $D_{ins}$ component of $T_{ins}$ of equation [3] is controlled by the VCON.DE output signal of insertion delay monitor 332 of FIG. 11. As described in detail hereinbelow, delay element monitor 330 is a phase locked loop circuit that continuously monitors the unit delay T and adjusts VCON.DE so that T remains constant. Similarly insertion delay monitor 332 continuously monitors $T_{ins}$ and adjusts VCON.INS to ensure $T_{ins}$ remains constant.

Figure 13:
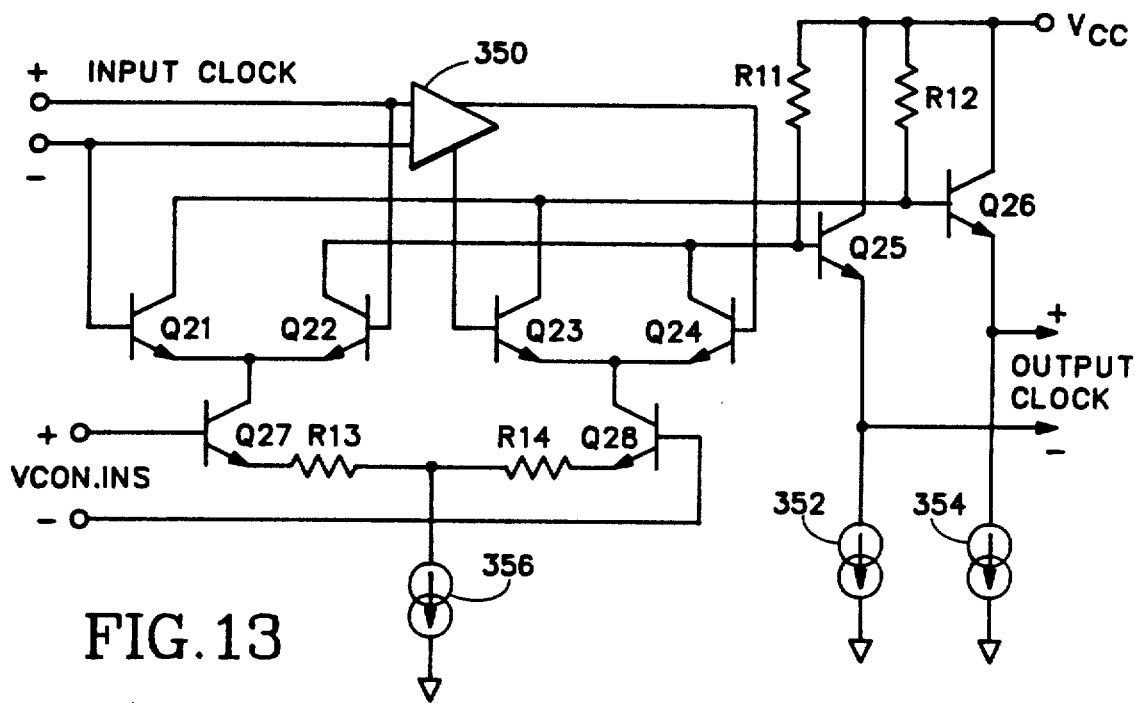
FIG. 13 is a schematic diagram of a delay element of FIG. 12.

The insertion delay circuit 342 is implemented by an adjustable delay element depicted in schematic diagram form in FIG. 13. The CLOCK signal and the VCON.INS control signal are differential signals as shown in FIG. 13. The differential input CLOCK signal is applied across the bases of an emitter-coupled transistor pair Q21, Q22 and also as input to a buffer 350 which delays the input CLOCK signal by a small amount. The output of buffer 350 is applied across the bases of another emitter-coupled transistor pair Q23, Q24. The collectors of transistors Q21 and Q23 drive the base of an output buffer transistor Q26 and the collectors of transistors Q22 and Q24 drive the base of another output buffer transistor Q25. The bases of transistors Q25 and Q26 are coupled to a positive voltage source Vcc through resistors R11 and R12, respectively, and the emitters of transistors Q25 and Q26 are coupled to ground through matching current sources 352 and 354, respectively. The emitters of transistors Q21 and Q22 are tied to the collector of a transistor Q27 and the emitters of transistors Q23 and Q24 are tied to the collector of a transistor Q28. The emitters of transistors Q27 and Q28 are coupled to a current source 356 through resistors R13 and R14, respectively. The VCON.INS control signal is applied across the bases of transistors Q27 and Q28 and the delayed output CLOCK signal appears across the emitters of transistors Q25 and Q26.

VCON.INS controls the relative proportion of the current output of current source 356 that is transmitted through the emitters of transistors Q21 and Q22 or through the emitters of transistors Q23 and Q24. Transistors Q21 and Q22 form a differential amplifier which amplifies the input CLOCK at the bases of transistors Q21 and Q22 to produce a first output differential current signal at their collectors. The gain of the Q21, Q22 amplifier is determined by the proportion of current from current source 356 supplied to their emitters through transistor Q27. Similarly, transistors Q23 and Q24 form a differential amplifier which amplifies the buffer 350 output signal at the bases of transistors Q23 and Q24 to produce a second output differential current signal at their collectors. The gain of the Q23,Q24 amplifier is determined by the proportion of current from current source 356 supplied to their emitters through transistor Q28.

On the rising edge of an input CLOCK signal pulse, transistor Q21 immediately begins to pull up the base of transistor Q26 and transistor Q22 begins to pull down the base of transistor Q25, thereby causing the output CLOCK signal voltage across the bases of transistors Q25 and Q26 to begin to go high. However, various capacitances in transistors Q21, Q22, Q25 and Q26 prevent the output CLOCK signal from rising abruptly. Buffer 350 has an inherent delay, and some time after the rising edge of the input CLOCK signal arrives at buffer 350, buffer 350 drives its output signal high, thereby causing transistor Q23 to begin pulling up the base of transistor Q26 and causing transistor Q24 to begin pulling down the base of transistor Q25.

Figure 14:
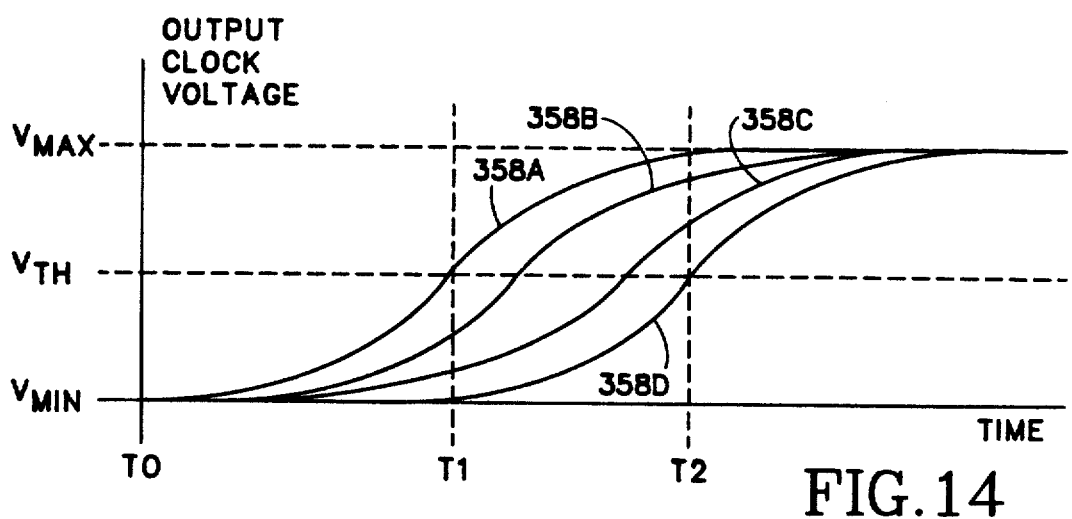
FIG. 14 is a timing diagram illustrating operation of the delay element of FIG. 13.

FIG. 14 is a timing diagram showing the way in which the output CLOCK signal changes from a minimum negative voltage VMIN to a maximum positive voltage VMAX after the rising edge of the input CLOCK signal arrives at the delay element at time T0. If VCON.INS is large and positive, then substantially all of the current output of current source 356 is directed to the emitters of transistors Q21 and Q22; transistors Q23 and Q24 are off and do not supply any current to the bases of transistors Q25 and Q26. In such case the amplitude of the delayed output CLOCK signal increases quickly as shown by curve 358A. Alternatively when VCON.INS is large and negative, transistors Q23 and Q24 are on and transistors Q21 and Q22 are off, and the output CLOCK signal voltage changes only in response to the delayed output of buffer 350. In such case the output CLOCK signal voltage rise is delayed by the delay time of buffer 350 as illustrated by curve 358D. By inspection of curves 358A and 358D, it can be seen that the output CLOCK signal rises above a threshold voltage VTH at time T1 when transistors Q21 and Q22 convey all of the current of current source 356 and rises above VTH at time T2 when transistors Q23 and Q24 convey all of the current of current source 356. If VTH is the threshold voltage at which the output CLOCK signal is considered to change state, then the "delay" of the delay element of FIG. 13 is the time at which the output CLOCK signal rises above the threshold voltage. Curve 358B shows the rise in output CLOCK signal voltage when transistors Q21 and Q22 carry about 80% of the current and transistors Q23 and Q24 carry about 20% of the current. Curve 358C shows the rise in output CLOCK signal voltage when transistors Q21 and Q22 carry about 20% of the current and transistors Q23 and Q24 carry about 80% of the current. Thus it can be seen that by adjusting the magnitude of VCON.INS, the delay of the delay element may be adjusted to any value between T1 and T2.

Figure 15:
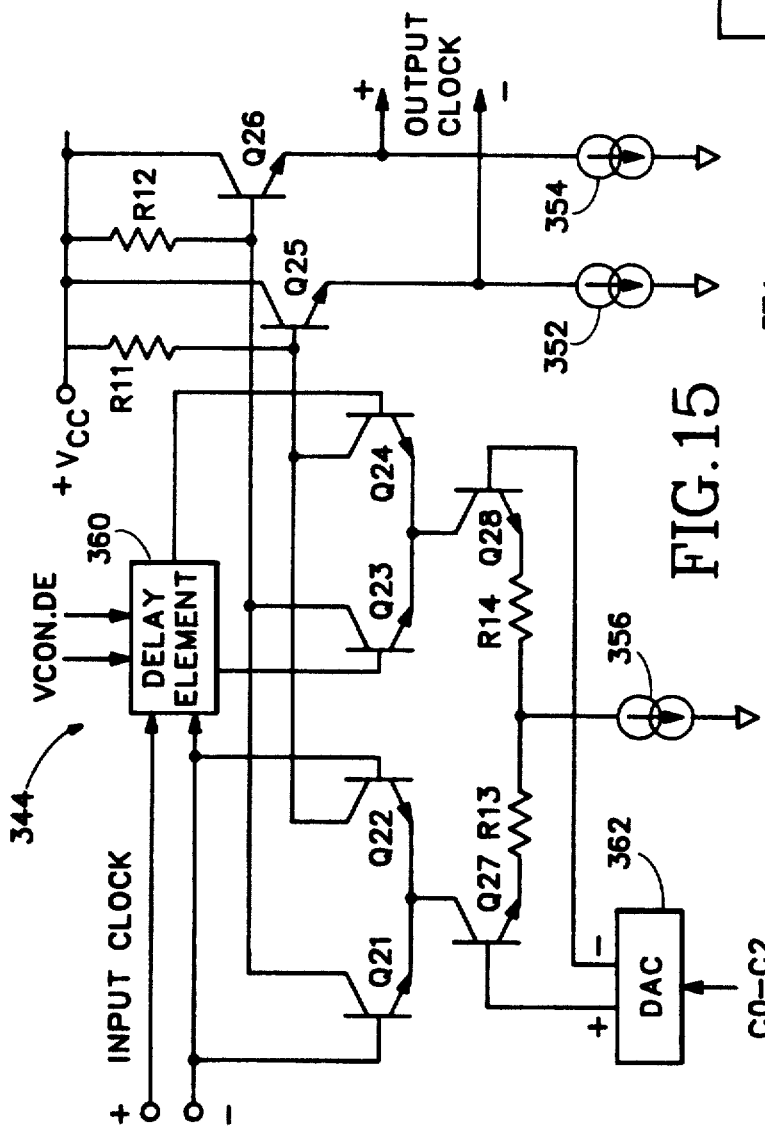
FIG. 15 is a schematic diagram of the fine delay circuit of FIG. 12.

As illustrated in FIG. 15, fine delay circuit 344 of FIG. 12 is similar to the delay element of FIG. 13 except that buffer 350 of FIG. 12 is replaced with another adjustable delay element 360 similar to the delay element of FIG. 13, and the control signal applied across the bases of transistors Q27 and Q28 is produced by a digital-to-analog converter (DAC) 362 in accordance with the input data C0-C2. The delay of delay element 360 is controlled by the VCON.DE signal so that it remains constant.

Delay circuits similar to those illustrated in FIGS. 13 and 15 are disclosed and claimed in the co-pending patent application of Lazlos Dobos, Ser. No. 07/125,022 filed Nov. 25, 1987, now U.S. Pat. No. 4,795,923, and in the co-pending application of Einar O. Traa, Ser. No. 07/125,023 filed Nov. 25, 1987, now U.S. Pat. No. 4,795,923, both entitled ADJUSTABLE DELAY CIRCUIT.

Figure 16:
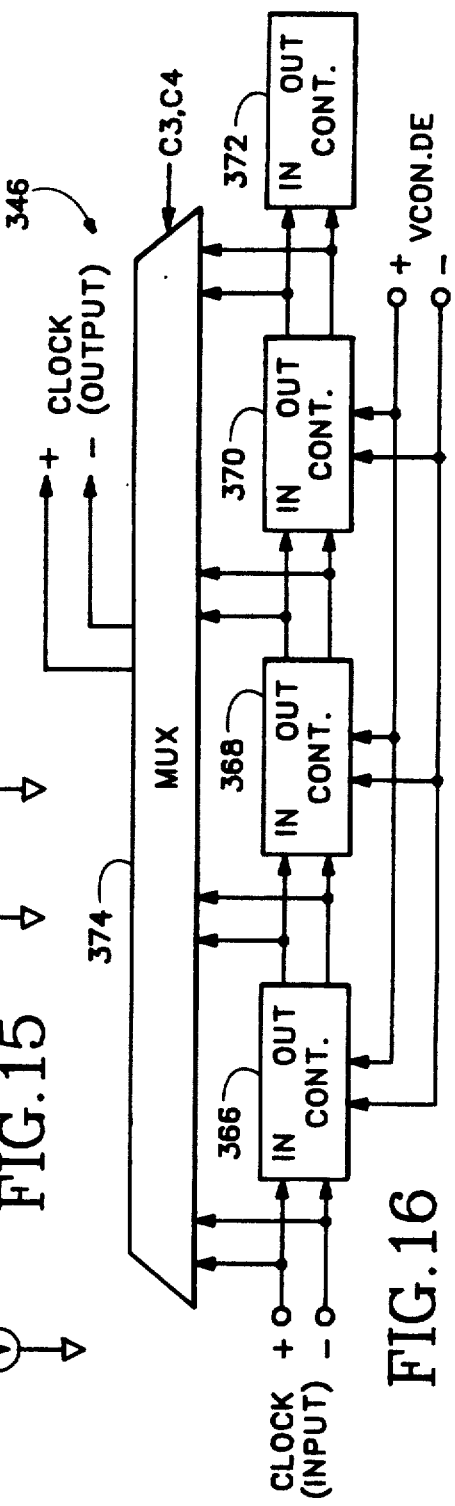
FIG. 16 is a schematic diagram of the coarse delay circuit of FIG. 12.

The coarse delay circuit 346, shown in more detail in FIG. 16, includes a set of four delay elements 366, 368, 370 and 372 connected in series and a multiplexer 374 which may selectively transmit either the CLOCK signal input to coarse delay circuit 346, or the output of one of delay elements 366, 368, or 370 to buffer 348 of FIG. 12. The output of delay element 372 is not used, but element 372 is provided so that elements 366-370 all have similar output loading. Multiplexer 374 switching state is determined by the C3 and C4 control data bits applied thereto. The delay of each delay element 366-372 is the unit delay T, and the unit delay is held to a constant value by the VCON.DE signal applied as control input to each delay element. Delay elements 366-372 are similar to the delay element shown in schematic diagram form in FIG. 13 except that VCON.DE rather than VCON.INS is applied across the bases of transistors Q27 and Q28.

FIG. 17 shows a block diagram of the delay element monitor 330 of FIG. 11. A set of delay elements 380, 382, 384, and 386, similar to delay elements 366-72 of FIG. 16, are connected in series with the output signal of element 386 being inverted and applied as input to element 380, thereby forming a ring-type oscillator 391 of period 8T, where T is the unit delay of each element 380-386. The output of each element is applied to a separate input of a 34×1 multiplexer 388, similar to multiplexer 374 of FIG. 16. The two control input bits to multiplexer 388 are tied to a voltage source of logic level "1" so that multiplexer 388 always selects the output of delay element 384. The output of multiplexer 388 is provided as an input to a frequency divider 390, which divides the frequency of its input signal by a factor of K to produce an output signal applied to a phase detector 392. Phase detector 392 compares the output of divider 390 to the reference clock signal REFCLK and produces an output signal which is high or low depending on whether the output signal produced by divider 390 leads or lags REFCLK. The phase detector output signal is filtered by a filter 394 to produce the VCON.DE output signal of the delay element monitor 330. VCON.DE is also applied to the control inputs of delay elements 380-386. Thus the output signal of divider 390 is phase locked to REFCLK, and the duration of the unit delay T of each delay element 380-386 is determined by the frequency dividing ratio K of frequency divider 390 in accordance with the expression $$T = 8T_{ref}/K \qquad [4]$$

where $T_{ref}$ is the period of REFCLK. When REFCLK is produced by a highly stable source such as a crystal oscillator, T is highly stable and not affected by changes in ambient temperature or variation in material or fabrication process utilized to manufacture integrated circuits utilizing the delay elements.

With reference to FIG. 18 showing the insertion delay monitor 332 of FIG. 11 in more detailed block diagram form, monitor 332 includes another delay circuit 318 identical to the delay circuits 318 of FIGS. 11 and 12 including input and output buffers 340 and 348, an insertion delay circuit 342, fine delay circuit 344 and coarse delay circuit 346. However in the delay circuit 318 of FIG. 18, the output of buffer 348 is negatively fed back to the input of buffer 340 to form an oscillator 401. The output of coarse delay circuit 346 is provided as input to a frequency divider 400, which divides the frequency of its input signal by a factor of M to produce its output signal. The output of frequency divider 400, along with the reference clock REFCLK signal are applied as inputs to a phase detector 402 similar to phase detector 392 of FIG. 17. The output of phase detector 402 is filtered by a filter 404 to produce the VCON.INS output signal of delay monitor 332.

The VCON.INS signal is applied to the control input of insertion delay circuit 342 while the VCON.DE signal is applied to the control inputs of delay circuits 344 and 346. The C0-C4 inputs of delay circuit 344 and coarse delay circuit 346 are tied to a "0" logic level source such that the delay of fine delay circuit 344 is its insertion delay I1 and such that the delay of coarse delay circuit 346 is its insertion delay I2. Thus the total delay between the input of buffer 340 and the output of buffer 348 is equal to insertion delay $T_{ins}$, as defined by equation [3] hereinabove, and the period of oscillation of the output signal of frequency divider 400 is $MT_{ins}$. Since the frequency divider output signal is phase locked to the period $T_{ref}$ of the reference clock, $$T_{ins} = T_{ref}/M \qquad [5]$$

Since M is a constant and $T_{ref}$ is highly stable, $T_{ins}$ is highly stable. Inasmuch as VCON.INS is applied as the control input to the insertion delay circuit 342 within every delay circuit 318 of FIG. 11, every delay circuit 318 has identical insertion delay $T_{ins}$. Substituting equations [4] and [5] into equation [2], the total delay of each delay circuit 318 of FIG. 11 is $$T_{tot} = [8m/K + n/K + 1/M]T_{ref} \qquad [6]$$

From equation [6] it is seen that the total delay $T_{tot}$ of each delay circuit 318 is proportional to the period $T_{ref}$ of the reference clock and the constant of proportionality is determined by a combination of m, n, K and M. K and M are constant frequency divider ratios and m and n are determined by the values of C0-C4. Therefore the delay provided by each delay circuit 318 is as stable as the period of the reference clock, which is highly stable.

FIG. 19 is a combination block and schematic diagram of a phase generator suitable for use as a phase generator 314 of FIG. 11 adapted to produce N clock phase signals PH1 - PHN, each having a period of $NT_{clock}/2$ where $T_{clock}$ is the period of the master CLOCK signal, the clock phase signals being phase shifted one from another by $T_{clock}/2$ seconds. The phase generator 314 comprises a sequence of N phase generator elements 406, each producing a separate one of the clock phase signal outputs PH1 - PHN in response to a combination of three inputs, the RESET1 signal, a prebias signal Vbias, and a timing control signal Iin. Each phase generator element 406 also produces a Vbout output signal which is in phase with its phase signal output. The Vbout output signal of each phase generator element 406 is provided as the prebias input signal Vbias to a next phase generator element of the sequence, with the Vbout output of the Nth phase generator element being provided as the Vbias input to the first phase generator element of the sequence. The RESET1 signal output of counter 338 of FIG. 11 is provided in parallel to the RESET1 input of each phase generator element 406. The CLOCK signal is applied across the bases of an emitter coupled transistor pair Q29, Q30, the emitters of transistors Q29 and Q30 being coupled to ground through a current source 408. The collector of transistor Q29 is connected to the Iin input of the "odd" phase generator elements 406 which produce odd numbered clock phase signals PH1, PH3, . . . , PH(N-1), and the collector of transistor Q30 is connected to the Iin input of the "even" phase generator elements which produce even numbered clock phases PH2, PH4, . . . , PHN. (N is always an even number.)

Each phase generator element drives its clock phase signal output and its Vbout output high when the current from current source 408 is supplied to its Iin input, provided, however, that its prebias Vbias input is high at the time. When the input current Iin is terminated, the phase generator element drives its clock phase and Vbout output signals low. As the CLOCK signal oscillates, it alternately switches transistors Q29 and Q30 on, thereby alternately connecting current source 408 to the Iin input terminals of the even and odd clock phase generator elements. When transistor Q29 is on, only a single one of the odd clock phase generator elements drives its output signals high because only one of these elements has a high prebias input signal. Similarly, when transistor Q30 is on, only a single one of the even clock phase generator elements drives its output signals high because only one of these elements has a high prebias input signal. Each time a particular clock phase signal PH1-PHN is asserted, the prebias input to the next phase generator element in the sequence is also asserted, and when the CLOCK signal next changes state, the clock phase signal output of that next phase generator element is asserted.

FIG. 20 shows a schematic diagram of the phase generator element 406 of FIG. 19 that produces the PH1 output signal. A three-emitter transistor Q31 produces the PH1 and Vbout signals at two of its emitters, and the third emitter is connected to the base of another transistor Q32. The Iin input appears at the emitter of transistor Q32, and the collector of transistor Q32 is connected to a positive voltage source Vcc through a resistor R19. The Vbias input to element 406 is also supplied to the base of transistor Q32. The collector of transistor Q32 is connected to the base of a transistor Q33 and the collector of transistor Q33 is coupled to Vcc through another resistor R20. The emitter of transistor Q33 is tied to the emitter of another transistor Q34, and the collector of transistor Q34 is tied directly to Vcc. The base of transistor Q34 is connected to a reference voltage source Vref. The RESET1 signal is applied across the bases of an emitter coupled transistor pair Q35 and Q36 and the emitters of transistors Q35 and Q36 are connected to a current source 410. The collector of transistor Q35 is tied to the emitters of transistors Q33 and Q34, and the collector of transistor Q36 is tied to the base of transistor Q31.

A phase generator similar to that illustrated in FIGS. 19 and 20 is disclosed and claimed in the co-pending application of Einar O. Traa, Ser. No. 07/098,110 filed Sept. 17, 1987, now U.S. Pat. No. 4,794,275, entitled MULTIPLE PHASE CLOCK GENERATOR.

During normal operation, the RESET1 signal is negative so that transistor Q35 is on and transistor Q36 is off. Thus, the current from current source 410 passes through either transistor Q33 or transistor Q34 via transistor Q35 depending on which transistor Q33 or Q34 is on and which is off. When transistor Q31 is off, but prebias input signal Vbias is high, transistor Q32 will begin conducting current when the CLOCK signal next switches transistors Q29 and Q30 of FIG. 19 so as to supply current to transistor Q32. The current through the collector-emitter path of transistor Q32 pulls the base of transistor Q33 below Vref causing current from current source 410 to be switched through transistor Q34. The drop in current through resistor R20 pulls up the base of transistor Q31 and turns it on, thereby driving the PH1 and Vbout signals high. The third emitter of transistor Q31 keeps transistor Q32 on even though the transistor Q31 in the preceding phase generator element supplying the prebias input Vbias is no longer on. When the CLOCK signal changes state, transistor Q29 of FIG. 19 turns off and current is no longer supplied to transistor Q32. Transistor Q32 turns off, resistor R19 pulls the base of transistor Q33 above Vref, transistor Q33 turns on, and transistor Q34 turns off. As transistor Q33 turns on, it pulls down the base of transistor Q31, Q31 turning it off, driving down PH1. However, the Vbout signal supplied as the prebias input to the next stage remains high due to the inherent capacitance at the base of the transistor Q32 of the next stage, and this ensures that transistor Q32 of the next stage turns on as current is supplied to its Iin input via transistor Q29 or transistor Q30 of FIG. 19.

All of the phase generator elements 406 of FIG. 19 are similar to the element shown in FIG. 20 except that the collector of transistor Q35 is tied to the base of transistor Q31 only in the phase generator element that produces PH1. In all other phase generator elements, the collector of transistor Q35 is tied to Vcc. When the RESET1 signal is asserted (driven positive), transistor Q35 in each phase generator element turns off and transistor Q36 turns on. In the first phase generator element transistor Q31 turns on, thereby asserting PH1. But in all other phase generator elements, since the collector of Q35 is tied to Vcc and not to the base of transistor Q31, transistor Q31 turns off, and PH2-PHN go low. When the RESET1 signal is subsequently deasserted shortly before the next rising edge of the CLOCK signal, the base of transistor Q32 of the first phase generator element stays high, due to its inherent capacitance, until the current from current source 408 of FIG. 19 turns transistor Q32 on. Thereafter the clock phase signals PH1-PHN are asserted in proper order as the CLOCK signal continues to change state. Thus assertion and deassertion of the RESET1 signal initializes operation of the clock phase generator 314 of FIG. 19 so that PH1 is asserted.

The base of transistor Q29 in each phase generator 314 of FIGS. 11 and 19 is accessed through a test pin 409 on each integrated circuit 316 which test pins are used when calibrating the system. Each pulse of the CLOCK input generates a test signal pulse on the test pin 409. With reference to FIG. 11, the test signals on the test pins of pairs of integrated circuits may be input to a logic gate, for example an XOR gate (not shown), and the output of the XOR gate may be monitored to determine if a test signal pulse on one test pin 409 rises substantially before or after the test signal pulse on the other test pin 409. The timing data C0-C4 supplied to each delay circuit 318 may then be adjusted in an iterative fashion to ensure that CLOCK signal pulses arrive at each test pin 409 at the same time.

Figure 21:
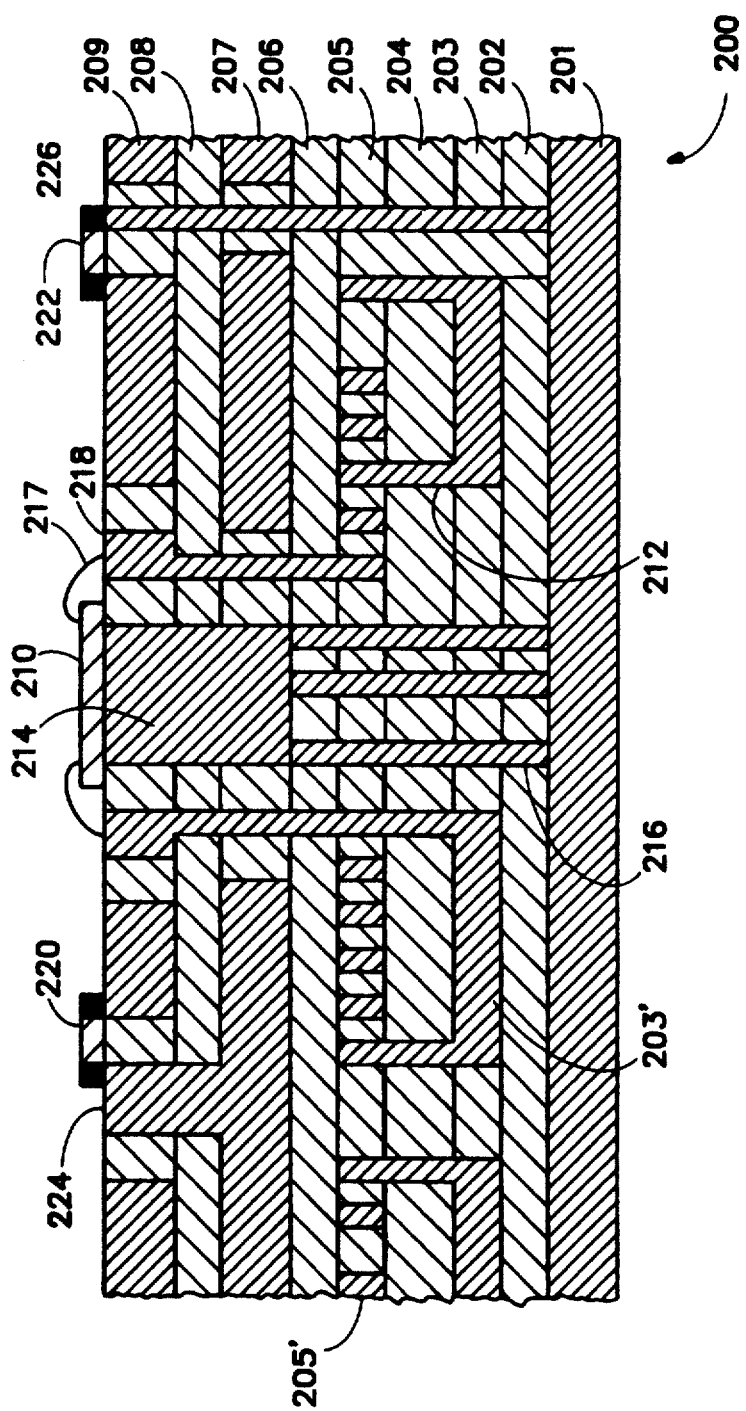
FIG. 21 is a section view of a portion of the transmission module of FIG. 5.

In accordance with the invention, the 11 separate integrated circuits of FIG. 5, along with integrated circuits implementing high speed memories 16-22 of FIG. 1 are mounted on and interconnected by a transmission module 200, a portion of which is shown in sectional view in FIG. 21. The transmission module comprises layers of microstrip conductors separated by dielectric layers of polyimide film. All 11 integrated circuits are glued on top of the uppermost conductor layer, and bonding pads of each integrated circuit are connected to conductors on the uppermost layer or to conductor layers therebelow through bond wires and vias extending through layers. .The conductors of the various layers form constant impedance transmission lines that interconnect the integrated circuits.

With reference to FIG. 21, transmission module 200 comprises an aluminum substrate 201 upon which has been deposited a first layer 202 of polyimide film. A first conductor layer 203 of thin metal is formed on top of polyimide layer 202 and portions of conductor layer 203 are etched away so that the remaining portions of layer 203 form conductors 203' extending in an "X" direction, i.e., right and left as shown in FIG. 21. A second polyimide layer 204 is deposited on top of conductor layer 203 and a second conductor layer 205 is deposited on top of polyimide layer 204. Conductor layer 205 is etched to form conductors 205' extending in a "Y" direction orthogonal to conductors 203'. A third polyimide layer 206 is then formed over conductor layer 205, and a third conductor layer 207 is formed above polyimide layer 206. Conductor layer 207 is a single conductor that conveys a ground plane in both X and Y directions. A fourth polyimide layer 208 covers conductor layer 207, and a fourth conductor layer 209 is deposited on polyimide layer 208. Layer 209 is the uppermost layer of transmission module 200 and conveys a VCC supply voltage. The aluminum substrate 201 conveys a VEE power supply voltage.

FIG. 21 shows an integrated circuit 210 glued on top of layer 209. In fabricating transmission module 200, portions of the polyimide layers 202, 204, 206 and 208 are etched away and the remaining holes in the polyimide layers are filled with conductive material to provide "vias" 212 extending vertically between conductor layers so as to electrically interconnect various conductors on the different layers. A large via 214 is formed under each integrated circuit 210 to provide a thermally conductive platform upon which the integrated circuit 210 is glued utilizing thermally conductive glue. Heat generated by integrated circuit 210 is transmitted into via 214 and conducted through via 214 and down to the aluminum substrate 201 by vias 216. The aluminum substrate 201 has a large surface area which helps to dissipate the heat. Bonding pads of the integrated circuit 210 are connected by bond wires 217 to vias 218 which extend to conductors therebelow. A capacitor 220 is soldered at one end to the VCC conductor layer 209 and at another end to a via 224 which extends downward to the ground plane layer 207. Another capacitor 222, also soldered at one end to the VCC conductor layer 209, is soldered at another end to a via 226 that extends down to the substrate 201. Capacitors 220 and 222 attenuate AC transients that may appear between the VCC, VEE and ground planes.

Dimensions of the components of transmission module 200 are exaggerated in FIG. 21 for illustrative purposes. The thickness of the polyimide layers separating conductors 203' and 205' from the substrate 201 and from the VEE conductor layer 201 and the width of the X and Y signal conductors control the characteristic impedance of microstrip transmission lines between the various integrated circuits and may be adjusted to provide a desired constant characteristic impedance. Methods for determining the proper spacing of microstrip conductors above ground planes to provide a selected characteristic impedance are well known in the art and not detailed herein. It is preferable that the microstrip conductors be sized such that the resistance of the transmission lines is negligible in comparison to their inductance and capacitance so as to keep the RC line charging time constant of the transmission lines as small as possible, thereby reducing signal delays.

Figure 22:
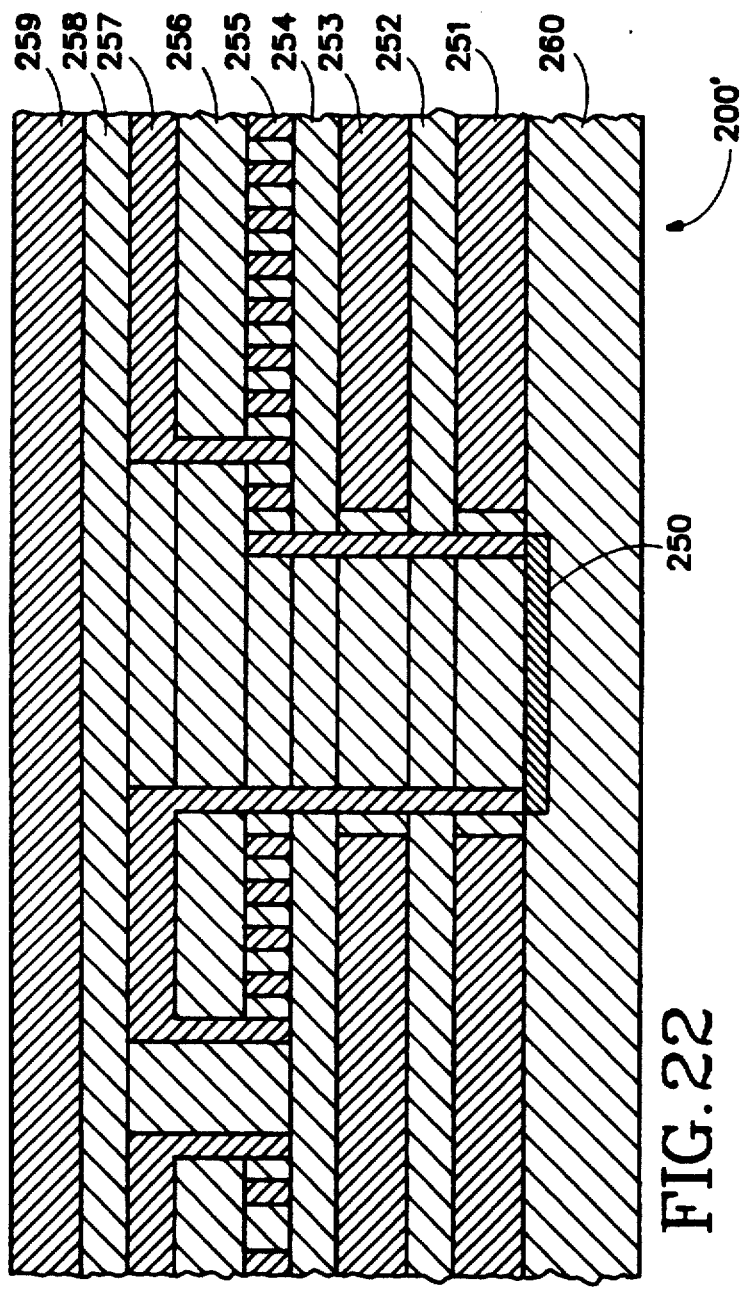
FIG. 22 is a section view of a portion of an alternative embodiment of the transmission module of FIG. 5.

FIG. 22 shows an alternative embodiment 200' of the transmission module 200 which interconnects undiced integrated circuits 250 still contained on a wafer 260. (Only a small portion of wafer 260 including one integrated circuit 250 is shown in FIG. 22.) With reference to FIG. 22, a first conductive layer 251 is deposited on top of wafer 260 for providing a VCC power plane. Portions of this layer are etched away to provide insulating gaps through which conductive vias extend. A first polyimide layer 252 is deposited on conductive layer 251 and a second conductive layer 253 conveying the ground plane is placed on layer 252. Another polyimide layer 254 covers layer 253 and is itself covered by a layer 255 including conductors for conveying signals in the Y direction. A polyimide layer 256 is deposited on layer 255 and another conductive layer 257, containing conductors for conveying signals in the X direction, is deposited on layer 256. Layer 257 is covered by a polyimide layer 258 and a final conductive layer 259 comprises the VEE power plane. The alternative embodiment 200' of the transmission module is useful when all of the integrated circuits to be interconnected are implemented on a common wafer because it eliminates the need for dicing wafers and connecting bond wires to bond pads of the individual integrated circuits.

A reduced instruction set computer processor has been shown and described, having a rapid access, dual port register file for supplying operands to a high speed arithmetic logic unit, and is implemented as a set of integrated circuits interconnected by short, constant impedance transmission lines and synchronized by a common clock signal. The transmission lines interconnecting the integrated circuits are formed by thin metallic conductors separated by dielectric polyimide membranes and the clock signal is adjustably delayed prior to transmission to each integrated circuit so that pulses of the clock signal arrive at each integrated circuit at the same time regardless of differences in inherent delays of the separate paths the clock signal must follow to each integrated circuit. It should be understood that while the present invention has been illustrated in conjunction with a computer processor, the invention may be utilized to implement large, high speed synchronous logic circuits other than computer processors wherein power dissipation or fabrication yield may be improved by partitioning a logic circuit into a plurality of separate, interconnected integrated circuits.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:
1. A logic circuit comprising:
   a plurality of first integrated circuits, each containing circuitry carrying out operations synchronized to a clock signal;
   means for generating a master clock signal;
   a second integrated circuit comprising a plurality of delay circuits, each receiving said master clock signal as input and producing a separate output clock signal in delayed response to said master clock signal; and
   means for conveying the output clock signal produced by each delay circuit to a separate one of said first integrated circuits for synchronizing operations of circuitry contained therein,
   delays between said master clock signal and the output clock signals of the delay circuits being independently adjustable for compensating for delay differences in time of output clock signal arrival at said first integrated circuits.
2. The logic circuit in accordance with claim 1 wherein at least one of said plurality of first integrated circuits contains circuitry comprising bipolar transistors.

3. The logic circuit in accordance with claim 1 wherein at least one of said plurality of first integrated circuits contains current tree logic circuitry.

4. A logic circuit comprising:
- a plurality of first integrated circuits, each for producing at least one output data signal and receiving at least one input data signal in synchronous relation to a clock signal;
- means for generating a master clock signal;
- a second integrated circuit comprising a plurality of delay circuits, each receiving said master clock signal as input and producing in response to said master clock signal a separate output clock signal in response to said master clock signal; and
- means for conveying ones of said input and output data signals between pairs of said first integrated circuits and for conveying the output clock signal produced by each delay circuit to a separate one of said first integrated circuits,
- delays between said master clock signal and the output clock signals of the delay circuits being independently adjustable for compensating for delay differences in time of output clock signal arrival at said first integrated circuits.

5. The logic circuit in accordance with claim 4 wherein said means for conveying signals comprises:
- a plurality of dielectric films; and
- a plurality of conductor planes, said dielectric films juxtaposed therebetween, each said conductor plane comprising at least one conductor, conductor pairs of separate planes forming constant impedance transmission lines for conveying said input and output data signals and the output clock signals.

6. The logic circuit in accordance with claim 5 wherein said dielectric films comprise polyimide film.

7. A computer processor comprising:
- a plurality of dielectric films;
- a plurality of conductor planes, each comprising at least one conductor, ones of said dielectric films being inserted between said conductor planes such that conductors of separate ones of said conductor planes form transmission lines for conveying signals, said transmission lines forming a first bus, a second bus, and a third bus;
- means for selectively transmitting data signals conveyed on said third busses to said first bus;
- a dual port addressable register file coupled to said first, second and third busses for receiving and storing data signals and for reading out stored data signals, said register file having a first port for receiving data signals conveyed on said first bus and for reading out data signals onto said second bus, and having a second port for receiving data signals conveyed on said third bus and for reading out data signals onto said third bus;
- arithmetic logic means for performing operations on data signals appearing on said second and third busses to produce output data signals said dual port addressable register file and said arithmetic logic means being implemented by a plurality of integrated circuits, each containing circuitry carrying out operations synchronized to a clock signal; and
- means for selectively placing said output data signals on said third bus.

8. The computer processor in accordance with claim 7 further comprising a single integrated circuit implementing a plurality of delay circuits, each for producing a separate output clock signal in separately adjustable delayed response to a master clock signal, the output clock signals produced by said delay circuits being conveyed by said transmission lines to separate ones of said plurality of integrated circuits for synchronizing operations thereof.

9. The computer processor in accordance with claim 7 wherein said dielectric films comprise polyimide film.

10. A computer processor comprising:
- a plurality of dielectric films;
- a plurality of conductor planes, each comprising at least one conductor, ones of said dielectric films being inserted between said conductor planes such that conductors of separate ones of said conductor planes form transmission lines for conveying signals, said transmission lines forming a first bus, a second bus, and a third bus;
- at least one first integrated circuit comprising dual port addressable register means for storing data signals conveyed on said first and third busses, having a first port for receiving said first data signals conveyed on said first bus and for reading out stored data signals onto said second bus, and having a second port for receiving said third data signal conveyed on said third bus and for reading out stored data signals onto said third bus; and
- at least one second integrated circuit comprising arithmetic logic unit means for producing output data signals comprising programmably determined combinations of said second and third data signals, and means for selectively conveying said output data signals to said third bus.

11. A computer processor implemented as a plurality of integrated circuits, ones of said integrated circuits operating in timed relation to a pulsed clock signal transmitted thereto, said processor comprising:
- arithmetic logic means for producing an output data signal representing a combination of a plurality of input data signals;
- multiple port register file means for supplying said input data signals to said arithmetic logic unit means and for storing data conveyed by said output data signals, said multiple port register file means and said arithmetic logic unit means being implemented by separate ones of said integrated circuits;
- an integrated circuit comprising a plurality of delay circuits, each delay circuit receiving a pulsed master clock signal as input and producing a separate output clock signal in delayed response to said master clock signal; and
- signal transmission means comprising metallic conductors separated by dielectric films forming transmission lines for conveying said input data signals and said output data signals between data signals and said output data signals between said register file means and said arithmetic logic mans, and for conveying separate ones of said output clock signals as pulsed clock signal input to said separate ones of said integrated circuits,
- delays between said master clock signal and the output clock signals of the delay circuits being independently adjustable for compensating for delay differences in time of output clock signal arrival at said first integrated circuits.

12. The computer processor in accordance with claim 11 wherein said arithmetic logic unit means comprises circuitry containing bipolar transistors.

13. The computer processor in accordance with claim 11 wherein said transmission lines have substantially constant impedance.

* * * * *